United States Patent
Liao et al.

(10) Patent No.: US 7,461,339 B2
(45) Date of Patent: Dec. 2, 2008

(54) CONTROLLING HOSTILE ELECTRONIC MAIL CONTENT

(75) Inventors: Jerry Chinghsien Liao, San Jose, CA (US); En-Yi Liao, Santa Clara, CA (US)

(73) Assignee: Trend Micro, Inc. (JP)

( * ) Notice: Subject to any disclaimer, the term of this patent is extended or adjusted under 35 U.S.C. 154(b) by 267 days.

(21) Appl. No.: 10/970,604

(22) Filed: Oct. 21, 2004

(65) Prior Publication Data

US 2006/0101334 A1    May 11, 2006

(51) Int. Cl.
    G06F 17/00    (2006.01)
(52) U.S. Cl. .............. 715/239; 715/234; 715/236; 715/250
(58) Field of Classification Search .......... 715/500, 715/513, 522, 524, 530, 200, 234, 236, 239, 715/248, 250, 255
    See application file for complete search history.

(56) References Cited

U.S. PATENT DOCUMENTS

| | | | |
|---|---|---|---|
| 6,230,171 B1 | 5/2001 | Pacifici et al. | |
| 6,393,468 B1* | 5/2002 | McGee | 709/218 |
| 6,480,962 B1 | 11/2002 | Touboul | |
| 6,938,087 B1* | 8/2005 | Abu-Samaha | 709/227 |
| 2002/0013910 A1 | 1/2002 | Edery et al. | |
| 2002/0040387 A1* | 4/2002 | Lessa et al. | 709/206 |
| 2002/0046041 A1 | 4/2002 | Lang | |
| 2002/0073330 A1 | 6/2002 | Chandnani et al. | |
| 2002/0128925 A1* | 9/2002 | Angeles | 705/26 |
| 2002/0152134 A1 | 10/2002 | Mcglinn | |
| 2002/0198866 A1 | 12/2002 | Kraft et al. | |
| 2003/0018752 A1 | 1/2003 | Lowy | |
| 2003/0042301 A1* | 3/2003 | Rajasekaran et al. | 235/380 |
| 2003/0159070 A1 | 8/2003 | Mayer et al. | |
| 2003/0188194 A1 | 10/2003 | Currie et al. | |
| 2004/0010566 A1 | 1/2004 | Monteverde | |
| 2004/0030788 A1* | 2/2004 | Cimo et al. | 709/229 |
| 2004/0039848 A1 | 2/2004 | Estrada et al. | |
| 2004/0073811 A1 | 4/2004 | Sanin | |
| 2004/0078422 A1 | 4/2004 | Toomey | |
| 2004/0123157 A1 | 6/2004 | Alagna et al. | |
| 2004/0199594 A1* | 10/2004 | Radatti et al. | 709/206 |
| 2004/0199773 A1* | 10/2004 | Radatti et al. | 713/176 |
| 2005/0108639 A1* | 5/2005 | Fields et al. | 715/531 |
| 2005/0154601 A1* | 7/2005 | Halpern et al. | 705/1 |
| 2005/0216564 A1* | 9/2005 | Myers et al. | 709/206 |
| 2005/0257261 A1* | 11/2005 | Shraim et al. | 726/22 |
| 2006/0053202 A1* | 3/2006 | Foo et al. | 709/206 |
| 2006/0064374 A1* | 3/2006 | Helsper et al. | 705/39 |
| 2006/0075028 A1* | 4/2006 | Zager et al. | 709/206 |
| 2006/0168006 A1* | 7/2006 | Shannon et al. | 709/206 |

* cited by examiner

*Primary Examiner*—Stephen S. Hong
*Assistant Examiner*—Gregory J Vaughn
(74) *Attorney, Agent, or Firm*—Beyer Law Group LLP

(57) ABSTRACT

A software module at an e-mail gateway server scans incoming e-mail messages suspected of being phishing messages and inserts a script program into the head or body of the message in HTML form. The message is converted into an HTML document if necessary. The script program is written in a language such as VBScript, JScript, ECMAScript or JavaScript and can be run in a browser. The modified message is delivered to the recipient. When the e-mail client software on the user's desktop encounters the HTML content a browser starts up and the script program is executed by the browser. The script program can then take any action necessary to counter any hostile content of the message such as providing a warning message, comparing hyperlinks, intercepting a redirect request, warning about suspect attachments, etc.

25 Claims, 19 Drawing Sheets

Phishing E-Mail Message

Spurious Web Site

225 →

| | 380 | 382 | 384 |
|---|---|---|---|
| | Parse For | Condition | Action |
| 390 | JavaScript Code | Message body contains JavaScript code | Delete JavaScript code |
| 392 | JavaScript Code | Message body contains JavaScript code | Transform JavaScript code into a comment |
| 394 | Keyword | A specific Keyword is present | Replace Specific Keyword with another |
| 391 | Attachment in message | Attachment is Executable | Insert Sender Domain into Script code |
| 393 | E-mail From: Header | Sender Domain Exists | Insert Sender Domain into Script Code |
| 395 | E-mail Received: Header | If Relay MTA Records Exist | Insert MTA Records into Script Code |
| 397 | E-mail Subject: Header | If E-mail Subject Exists | Insert E-mail Subject into Script Code |
| 398 | E-mail X-Keyword: Header | If the X-Keyword Exists | Insert X-Keyword into Script Code |
| 396 | ... | ... | ... |

Rule Base

*FIG. 9*

Attachment to Modified Message

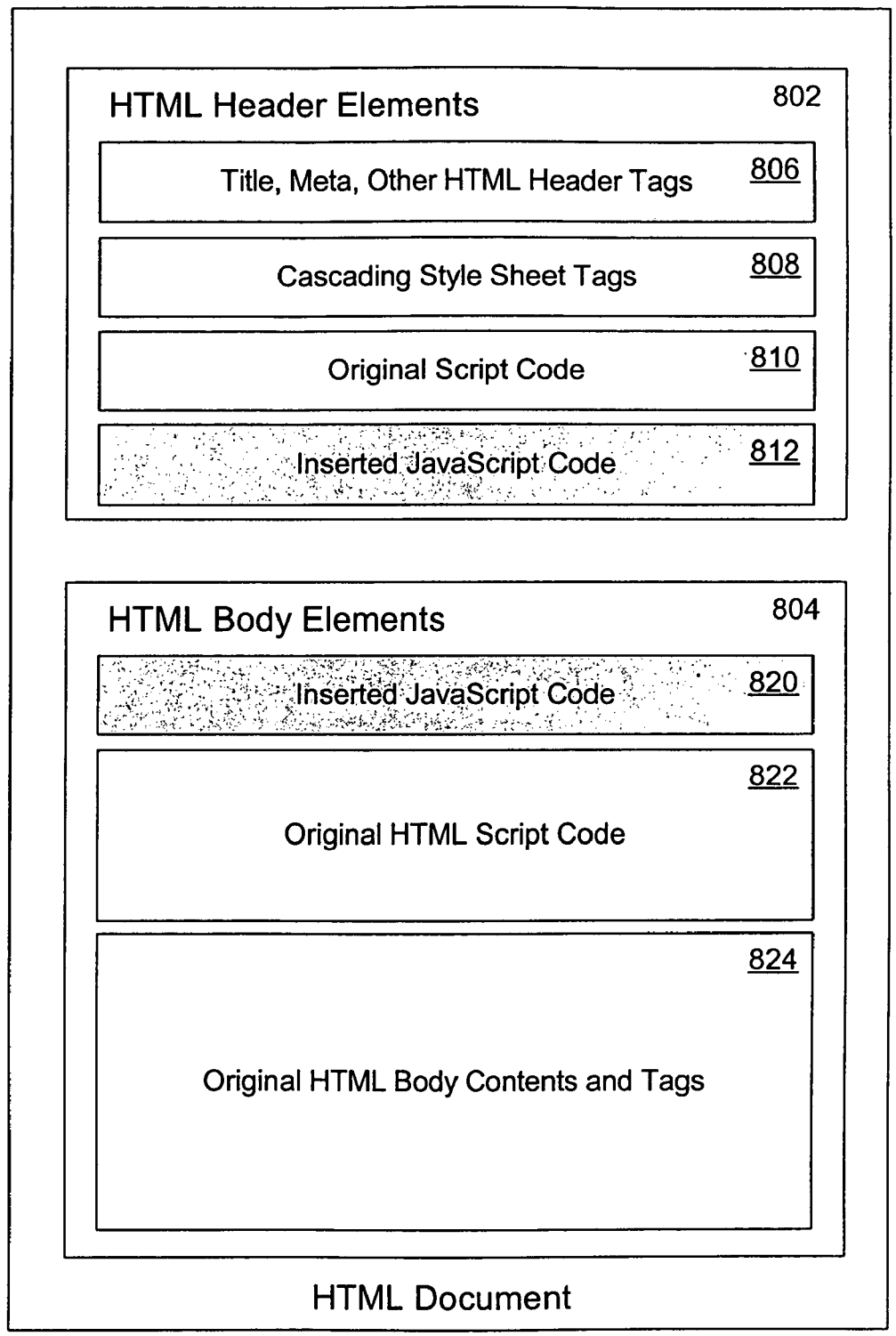
FIG. 14

CONTROLLING HOSTILE ELECTRONIC MAIL CONTENT

FIELD OF THE INVENTION

The present invention relates generally to screening of electronic information destined for an end user. More specifically, the present invention relates to automatic insertion of scripting code into electronic messages to counter hostile content.

BACKGROUND OF THE INVENTION

A current type of electronic scam uses an e-mail spoof (a deceptive e-mail message) and a fraudulent web site designed to fool consumers into divulging personal financial data such as credit card numbers, bank account information, user names and passwords, social security numbers, etc. By hijacking the trusted brands of well-known banks, on-line retailers and credit card companies, Internet scammers are able to convince up to 5% of recipients to respond to them. In essence, these scammers are fishing for sensitive information, hoping that consumers will be duped into providing it. The term phishing has been coined to describe this type of scam.

In a phishing scam, the scammer sends an e-mail message that claims to be from a business or organization that you normally deal with, for example, your Internet service provider, bank, on-line payment service, or even a government agency. The message usually says that you need to "update" or "validate" your account information. It might threaten some consequence if you do not respond. The message directs you to a spurious web site that looks just like a legitimate web site. The purpose of the spurious web site is to trick you into divulging your personal information so that the scam operators can steal your identity and run up bills or commit crimes in your name. There is no effective approach or product to either identify or block unknown phishing e-mail messages in the current market.

FIG. 1 is an example of an actual phishing e-mail message. Table 1 below summarizes the content of the phishing e-mail message.

This code indicates that the actual address to where the consumer will be directed is the IP address "61.128.198.62," instead of to the domain name www.xyzbank.com as is shown on the face of the e-mail message. The problem is that most consumers will never check this source code. Once a consumer clicks on the spurious URL link, two browsers are created that have the appearance of an official XYZBank web site (in this particular example).

FIG. 2 shows two windows that are open. In the background the scammer has opened a browser that shows a page from the official XYZBank web site (or in some cases even the background window will be fake). In the foreground is what looks to be a small dialog box from XYZBank, but in reality it is a second browser that has also been opened by the scammer for the purpose of stealing sensitive consumer information. This phishing browser window mimics a dialog box that a consumer would think has been created by the official XYZBank web site. To hide the fact that this second window is actually a new browser showing a spurious web site and not a dialog box, the scammer also fakes the SSL lock icon and disables the original one, hides the status bar (so the open-lock icon will not appear), and draws a fake 128-bit SSL icon. Once the consumer enters his or her sensitive information the scammer has access to the information and can then perform illegal actions with the stolen information.

There are current approaches to deal with phishing. For example, the following have been proposed: strong website authentication, mail server authentication, digitally-signed e-mail with desktop verification, and digitally-signed e-mail with gateway verification. Strong website authentication would require all users of legitimate e-commerce and e-banking sites to strongly authenticate themselves to the site using a physical token such as a smart card. Mail server authentication requires almost all ISPs, web e-mail providers and corporations to publish their mail server authentication information and install mail server authentication software as part of their e-mail filters. There are numerous technical proposals such as RMX (resource record on DNS) and SPF (Sender Policy Framework) for how this would work. The digitally signed e-mail with desktop verification approach is based on

TABLE 1

| | |
|---|---|
| Subject | Regarding Your XYZBank ATM Card |
| Target | XYZBank customers |
| Format | HTML e-mail |
| Apparent Sender | XYZ Identity Theft Solutions [support@xyzbank.com] |
| From the Real Organization? | No. |
| Call to Action | "In order to safeguard your account, we require that you update your XYZBank ATM/Debit card PIN . . . This process is mandatory, and if not completed within the nearest time your account may be subject to temporary suspension." |
| Goal | Getting victim's XYZBank credit card and bank account numbers, and credit card PIN. |
| Call to Action Format | URL Hyperlink |
| Visible URL | https://www.xyzbank.com/signin/xyzfi/scripts/login2/update_pin.jsp |
| Actual URL | http://61.128.198.62/Verify/ |
| Spurious Web Site | Located at: 61.128.198.62 |

If one were to perform a right click on the phishing e-mail message and select "View Source" in the menu, the following would be visible as part of the source code:

<a href=http://61.128.198.62/Verify/

>https://www.xyzbank.com/signin/xyzfi/scripts/login2/update_pin.jsp</a><br> the use of the existing industry standard S/MIME, which is a secure e-mail standard supported by most e-mail client software that is in use in corporations today. Companies who are vulnerable to phishing attacks would send their e-mail messages with a digital signature attached. If a message arrives for a user that is either not signed or the signature can not be verified, the user would know that it is not a genuine message from the sending bank or e-commerce provider. The digitally signed e-mail with gateway verification approach uses the S/MIME standard for e-mail that is widely available today. Instead of relying on the end user's e-mail client to verify the signature on the message, a gateway server at the mail relay level would verify the signatures before they were even received by the receiver's e-mail server. For a variety of reasons, these solutions are not optimal. For example, strong web site authentication and mail server authentication can be difficult or complex to deploy due to technical or political issues. Also, the approaches of digitally signed e-mail with desktop verification or with gateway verification have been adopted by some companies are not widely used.

Other approaches are also being tried but are not optimal. For example, one technique would be to use anti-spam software to block phishing attempts from known senders of fake e-mail messages. Briefly, a vendor would analyze the fake e-mail message and create a pattern file to distribute to end-users. It would take some time for the pattern to be developed and for the pattern to be distributed. This technique is often not effective since the scammer's web site would likely be shutdown once they are found out and become known to anti-spam software developers. Even if not found out, some phishing web sites may disappear within a few days or even after a few hours. Also, a consumer might not update their anti-spam software in a timely fashion. And this technique only stops phishing from known senders. More problematic are phishing e-mail messages sent from unknown entities. Most anti-spam products would not catch this kind of e-mail message since phishing e-mail messages often look even more formal than official messages from real vendors. It could be possible to tune the anti-spam software to intercept unknown phishing messages, but this would likely result in any normal message from outside businesses also being blocked. This result is not desirable for the consumer as well.

Other techniques use software agents on a client computer to combat phishing-related e-mail messages. Published U.S. patent application Ser. Nos. 10/733,655 and 10/273,236 both are examples of agent-based techniques. An agent-based technique is not optimal in that it requires special software on the end-user computer that can be expensive and difficult to maintain.

Thus, further improvements are needed to address the phishing attack.

SUMMARY OF THE INVENTION

A method for controlling and restraining the damage caused by malicious or hostile e-mail content is provided. Due to wide spread spoofing of electronic e-mail messages (phishing e-mail messages) and spurious web sites, more and more instances of damage have been reported especially from banking and online e-commerce industries regarding the loss of money or customer privacy information. Due to the nature of the "hit and run" strategy adopted by this category of scammers, existing signature- or pattern-based interception art might not provide a useful and timely zero-day protection to most end users.

A heuristic approach is described to effectively mitigate the damage caused by this kind of hostile content. This technique provides for an immediate analysis of suspected phishing e-mail messages and does not require development of pattern files or other software that must be distributed to an end-user before suspect e-mail messages can be analyzed or eliminated. Generally, the present invention allows for the insertion of script code into an electronic message and is applicable to any of a wide variety of messaging systems.

Further, in one particular embodiment, no agent software is required on the end-user computer. Thus, implementation of this technique is simple and less expensive. Unlike prior art techniques that require agent software on an end-user computer, the technique of this embodiment does not require any extra software on the end-user computer. In one specific embodiment, an insertion module located on a gateway computer scans incoming e-mail messages and inserts script code into those messages that are potentially hostile. The message is then delivered to the end-user. Because the gateway computer only inserts the code and does not perform further processing or execution of the code, the impact on the resources of the gateway computer is lessened. The execution of the code can be performed by standard browser software on the end user's computer, thus obviating the need for any extra or special software to be installed and maintained on the end-user computer.

In contrast to the prior art pattern-matching technique, the present invention has many advantages. This prior art technique relies upon customers to send phishing message samples to a security vendor, whose staff then examines the samples and identifies the unique pattern for those samples (for example, the IP address of the embedded URL links, the sender address, the subject, etc.). The staff of the vendor then delivers the pattern file to their customers that run the vendor's applications, and the applications use the new pattern file to filter all incoming messages. While this technology might do well at identifying most all of the known phishing messages, it cannot identify unknown phishing e-mail messages. Further, it cannot provide protection for a zero-day attack; it takes time for the vendor to obtain the sample, identify the unique signature, and provide the pattern file to customers. Damage can easily be done in the meantime.

By contrast, the present invention can be adopted on an e-mail server or gateway computer with very minimal performance degradation. This is because the heuristic rules are implemented in the script code that is inserted into the message and then run on the client side. It is not necessary to install a special client-side component because most all modern Web browsers will support the scripting language used, especially JavaScript. The present invention is easy to manage because the script code to be inserted can be located at a single point, such is on an e-mail server or gateway computer. Thus, an administrator can easily replace the script code with a new version if necessary.

BRIEF DESCRIPTION OF THE DRAWINGS

The invention, together with further advantages thereof, may best be understood by reference to the following description taken in conjunction with the accompanying drawings in which:

FIG. 9 illustrates one embodiment of a rule base that may be used in conjunction with an insertion module.

FIG. 14 illustrates another embodiment of an HTML document that may be an attachment to the modified message.

DETAILED DESCRIPTION OF THE INVENTION

In order to overcome the problems mentioned above with the phishing attack and currently available techniques, it is realized that software can be inserted into an e-mail message and then run on the client side. No extra client-side agent software would be needed as the inserted software is present within (or attached to) the e-mail message itself.

The present invention is applicable to any electronic messaging system in general, and can be used with electronic messages such as the commonly referred to "e-mail" and instant messages. Electronic messages known as e-mail include those messages implemented using SMTP and other similar protocols; instant messages include those instant messaging systems using protocols provided by Microsoft, Yahoo, AOL, ICQ, etc. Other similar types of electronic messages are also within the scope of this invention. For ease of understanding of the examples provided herein, the following text refers to e-mail messages in the examples, but the invention is not so limited.

In one specific embodiment, any scripting software program suitable for running in a browser written in a language such as VBScript, JScript, ECMAScript or JavaScript is inserted into an e-mail message. A software module associated with an e-mail gateway server (for example) scans incoming e-mail messages that are suspected of being phishing messages and inserts a script program into the messages. In a specific implementation, the message body of a particular message and the inserted script program are combined together to become an HTML attachment file. When the user receives the message and opens the attachment, a browser starts up and the script program is executed by the browser prior to rendering the HTML content on the screen. Thus, the script program is able to modify the e-mail body, retrieve URL link information, perform rule-based intelligence, and provide warnings to the user when he or she is trying to link to a suspected phishing web site.

The inserted script program can intercept any URL request or similar activity. For example, the script program enumerates all HTML elements that can possibly trigger a URL request. Once a JavaScript object that represents an HTML element is obtained, the element can be modified anyway the programmer desires, information associated with the HTML element can be retrieved, or other actions can be taken. With the help of cascading style sheets, the effect is even better. The inserted script program can also modify the HTML content of the message or perform other useful events or methods provided by a browser DOM (Document Object Model).

The script program can also be made part of a frequent update to anti-virus or anti-spam software so that the script program located on the gateway computer (for example) is updated frequently, thus insuring updated functionality on the end user's computer. This updating allows the technique to deal with future unknown phishing attempts.

EXEMPLARY ENVIRONMENT

Figure 3:
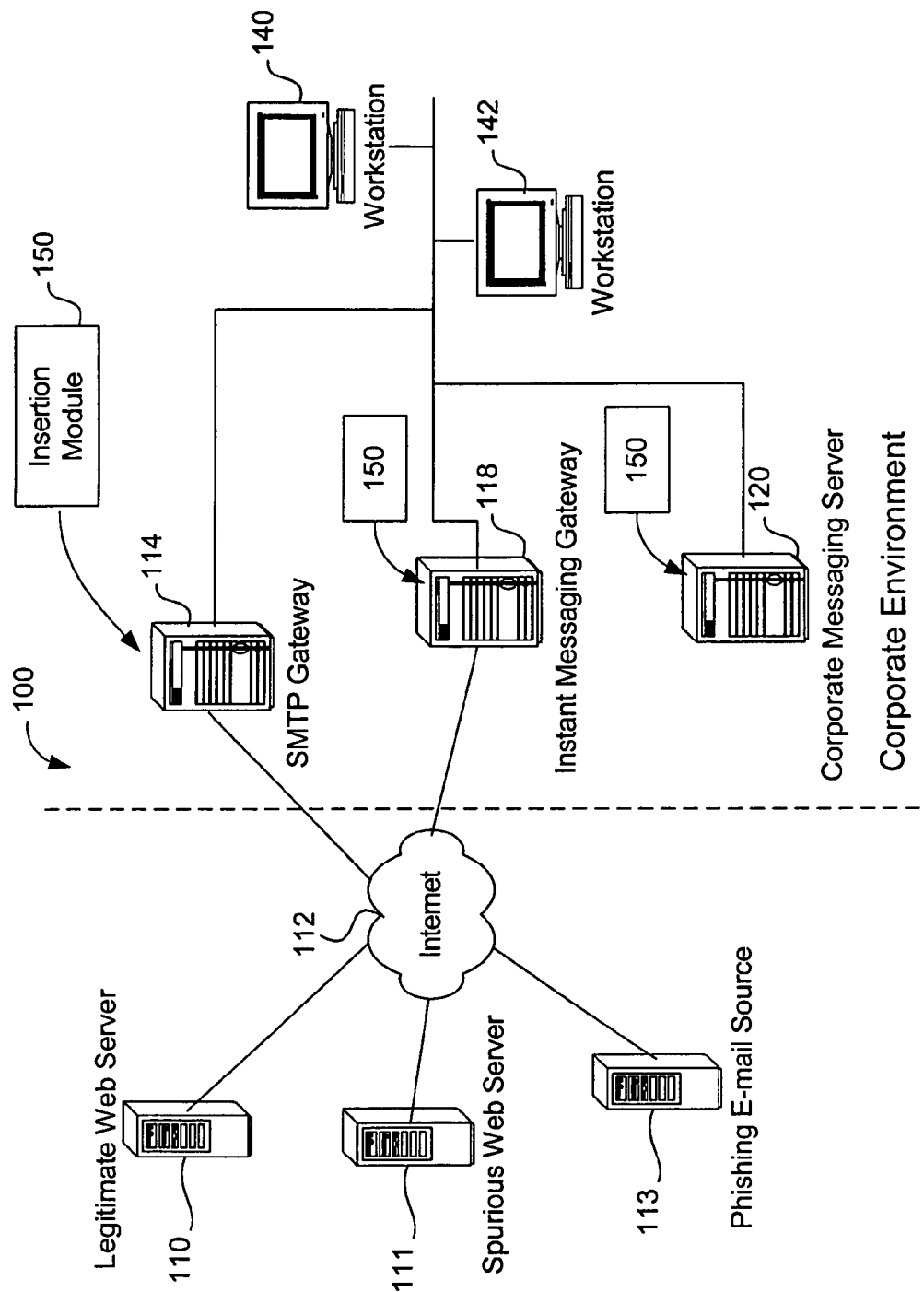
FIG. 3 is a block diagram of an exemplary environment in which the present invention may be used.

FIG. 3 is a block diagram of an exemplary environment 100 in which the present invention may be used. Shown connected to Internet 112 are any number of legitimate web servers 110 that host legitimate web sites that can be accessed over the Internet. Also shown is server 113 that is an e-mail phishing source, such as in e-mail server or an e-mail client. Also connected to Internet 112 are any number of spurious web servers 111 that are operated by Internet scammers as have been described above.

Environment 100 also shows any number of other computers 114-120 that allow end users of workstations 140 and 142 to communicate with other entities via the Internet 112 in order to send/receive e-mail messages, send/receive instant messages, view and communicate with web sites, etc. These computers are part of a corporate (for example) environment shown to the right side of the dashed line. SMTP gateway computer 114 is a typical e-mail server computer arranged to deliver e-mail messages to a destination e-mail server that eventually delivered to end users. Instant messaging gateway 118 is a typical IM gateway computer allowing end users to send and receive instant messages. Computer 120 is any other type of computer such as a corporate messaging server, a gateway computer, an IBM Domino server or a Microsoft Exchange server, etc.

In a particular embodiment of the invention, a software insertion module 150 is present within any one or all of each of the computers 114-120 or is in close association with one of these computers. As will be further explained below, insertion module 150 is arranged to accept intercepted incoming e-mail messages and to insert appropriate computer code into those messages in order to control, restrain or remove hostile content of those messages before those message can do harm to end users. In other embodiments module 150 can be located almost anywhere during the transportation of the message in order that computer code may be inserted. For example, module 150 may be located on the client side on the end users own computer such that the module performs code insertion before the user sends the message. Also on the sending side, the sender's e-mail server (such as an ISP dial-up e-mail server) may include the insertion module. As described above, a gateway server on the receiving side may contain an insertion module, and an e-mail server on the receiving side may also include such a module. Finally, insertion module 150 may also be implemented on the final end user's desktop computer such that insertion and processing occur before the user is able to view the message.

Module 150 may be implemented as a plug-in module to a server, as a standalone application that communicates with the server through any IPC (Inter-process Communication) mechanism, or as a remote process that resides on another machine that communicates with the server through a remote IPC such as sockets, RPC (Remote Procedure Call), CORBA (Common Object Request Broker Architecture), DCOM (Distributed Component Object Model), etc. We use with the term "module" to refer to all of these implementations and for ease of use.

Figure 4:
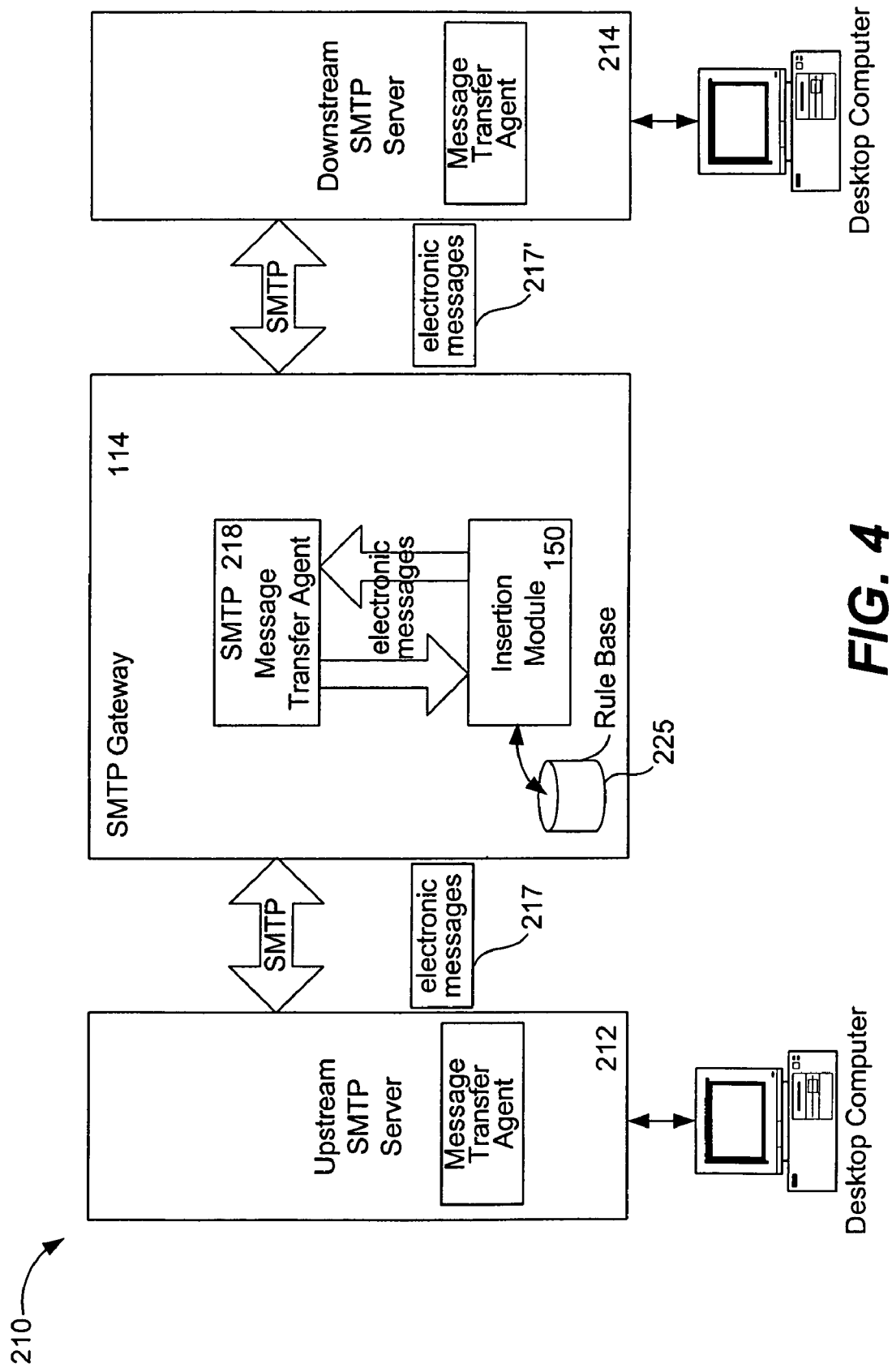
FIG. 4 illustrates how an insertion module interacts with software on a gateway computer to receive intercepted messages and to process incoming messages.

FIG. 4 illustrates how insertion module 150 interacts with software on a gateway computer to receive intercepted messages and to process incoming e-mail messages. In this particular embodiment, gateway computer 114 is located between upstream server 212 and downstream server 214. Other embodiments are possible in which insertion module 150 is located on downstream server 214 and no gateway computer is used. In this example, SMTP (Simple Mail Transfer Protocol) is used to control the exchange of e-mail messages between two mail servers 212 and 214. SMTP is used on the Internet and is defined by the IETF. Using SMTP, a process can transfer mail messages to another process on the same network or to some other network via a relay or a gateway process accessible to both networks. A mail message may pass through a number of intermediate relay or gateway hosts on its path from sender to the ultimate recipient. Other protocols such as HTTP, POP, and IMAP are also suitable for use with the present invention.

Generally, there are two types of software programs used in the process of sending and receiving electronic mail. A user's e-mail agent is the software program that a user uses to type an e-mail message and to read messages on his or her desktop computer. A message transfer agent (MTA) is software running on a local e-mail server that is used to both forward and receive messages over the Internet. An e-mail sender uses his or her e-mail agent on a desktop computer to compose a message and to send the message to an MTA A on a local e-mail server. Typically, the MTA A then forwards (or relays) the message over the Internet to a remote MTA B (located on an e-mail server local to the recipient) where the message recipient is hosted. MTA B may notify the e-mail agent on the recipient's desktop computer that a new message has arrived. Or, the e-mail agent on the recipient's desktop may periodically poll MTA B to see if there are any new messages. Either way, the e-mail agent on the recipient's desktop notifies the recipient that a new message has arrived.

As shown in FIG. 4, electronic messages 217 sent from a sender will pass via server 212 using SMTP and arrive typically at gateway 114. Here, in one embodiment, insertion module 150 interacts with MTA 218 to process incoming electronic messages 217, process the messages and perhaps insert program code, and then return these modified electronic messages 217' to MTA 218. These messages are then sent from gateway 114 to downstream server 214 which eventually would transfer the messages to the appropriate end users. Insertion module 150 can be implemented as a plug-in module to a server, as a standalone application that communicates with the gateway through an IPC mechanism (such as sockets, RPC, DCOM etc.), or as a remote process that communicates with the gateway through a remote IPC mechanism. The implementation of intercepting messages in the chain of transportation may be performed in the following exemplary ways: (1) an SMTP sandwich format (MTA-gateway-MTA); (2) an SMTP proxy format (gateway-MTA); (3) an SMTP plug-in format (the insertion module works as a plug-in to a standard MTA program, e.g., Postfix, Microsoft SMTP service etc.); or (4) an in-line network packet filtering component that does not have an SMTP MTA module inside; the in-line network packet filtering component performs deep packet scanning and filtering out of SMTP traffic.

Figure 5:
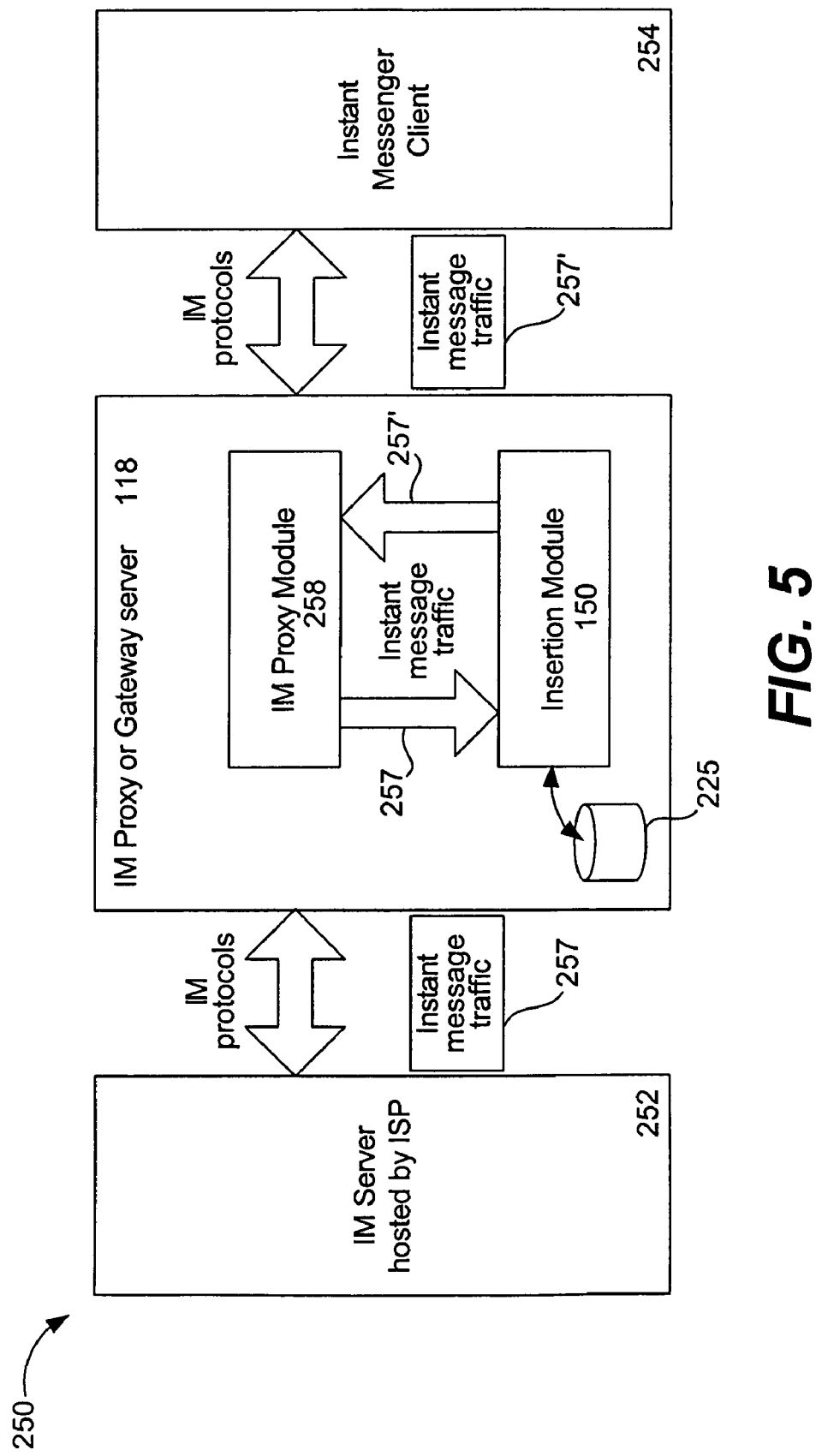
FIG. 5 illustrates an insertion module located on an IM proxy or gateway server that is used to process intercepted instant messages.

FIG. 5 illustrates an insertion module 150 located on a proxy or gateway server 118 that used to process intercepted instant messages. Instant message traffic 257 is intercepted by proxy module 258 and the message can be processed in a similar fashion as an e-mail message to produce a modified instant message to 257'.

Figure 6:
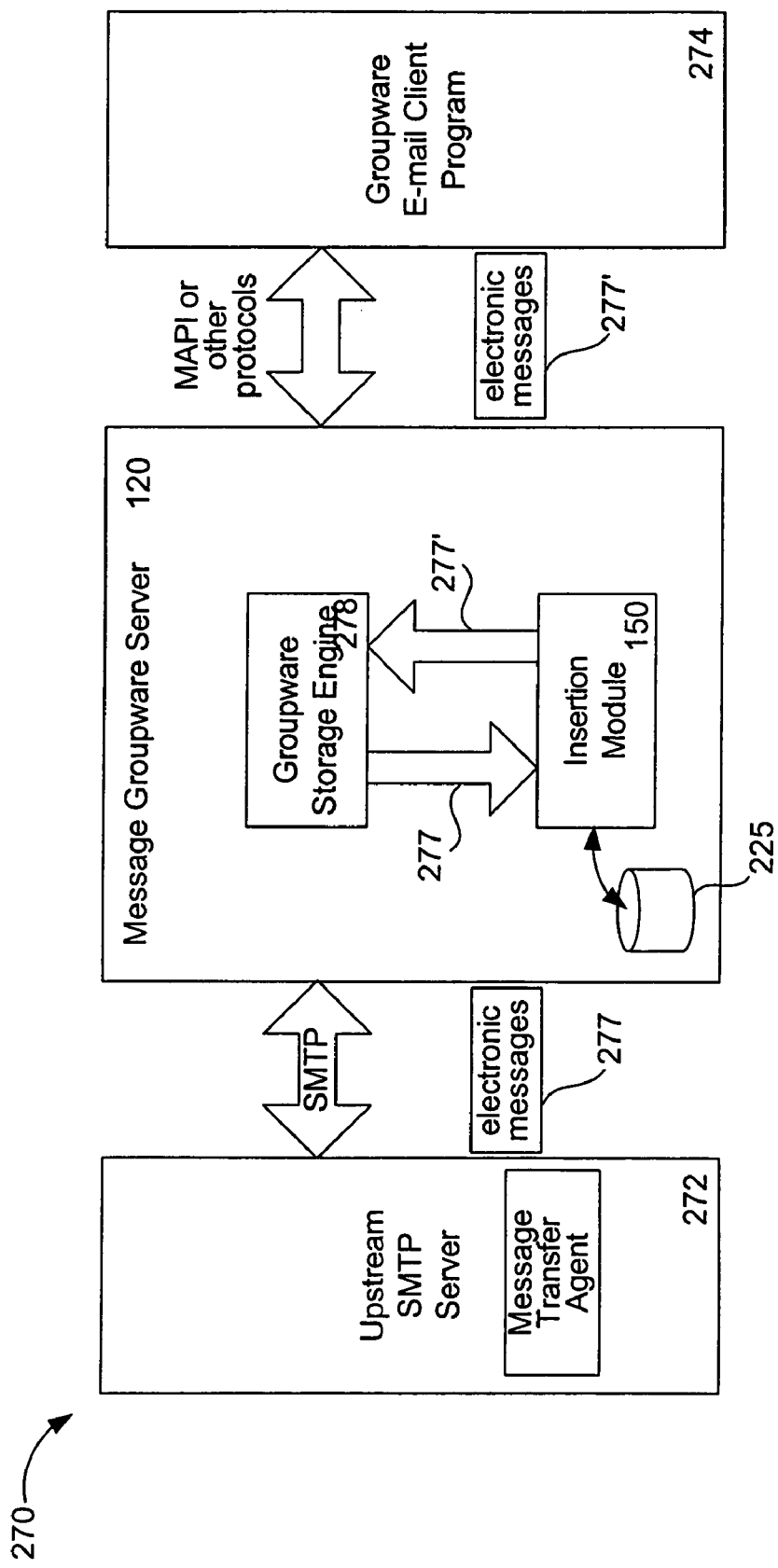
FIG. 6 illustrates an insertion module located on a corporate groupware server that is used to process intercepted incoming messages.

FIG. 6 illustrates an insertion module 150 located on a corporate groupware (also called messaging and collaboration server) server 120 that is used to handle incoming messages. The implementation of insertion module 150 may be in any of the following forms: (1) a groupware client module that interacts with a groupware server through open interface protocols (like Microsoft MAPI) to scan all network groupware messages, (2) a software hook module that interacts directly with the groupware storage engine to intercept all network groupware traffic, (3) a plug-in module which interacts with the corporate groupware server through open interface protocols like Microsoft VSAPI. In general, the module can be inserted in any place between the content transportation end points. For example, between e-mail agents for SMTP, or between the target web server and user browser.

Figure 7A:
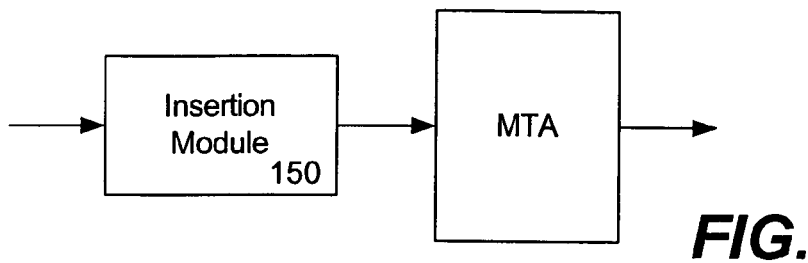
FIGS. 7A-7C illustrate variations on how an insertion module may be located in relation to a message transfer agent (MTA).
Figure 7B:
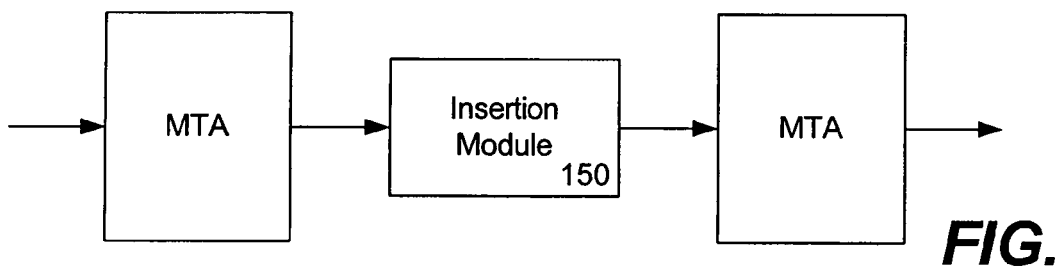
Figure 7C:
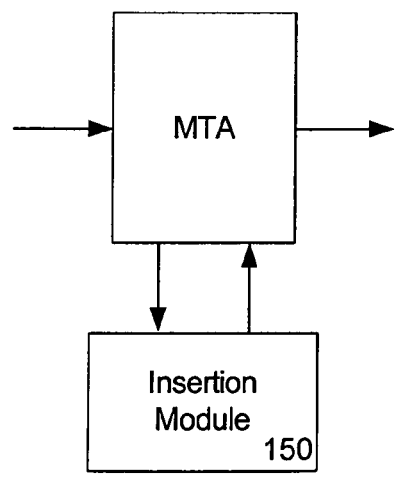

FIGS. 7A-7C illustrate variations oil how insertion module 150 may be located in relation to a message transfer agent (MTA) as has been described above. FIG. 7A shows all insertion module 150 positioned before a destination MTA. FIG. 7B shows all insertion module positioned between two MTA's such as might be present on a gateway computer. FIG. 7C shows an insertion module that uses an interface plug-in with an MTA.

CONTROL OF CONTENT IN E-MAIL MESSAGES

Figure 8:
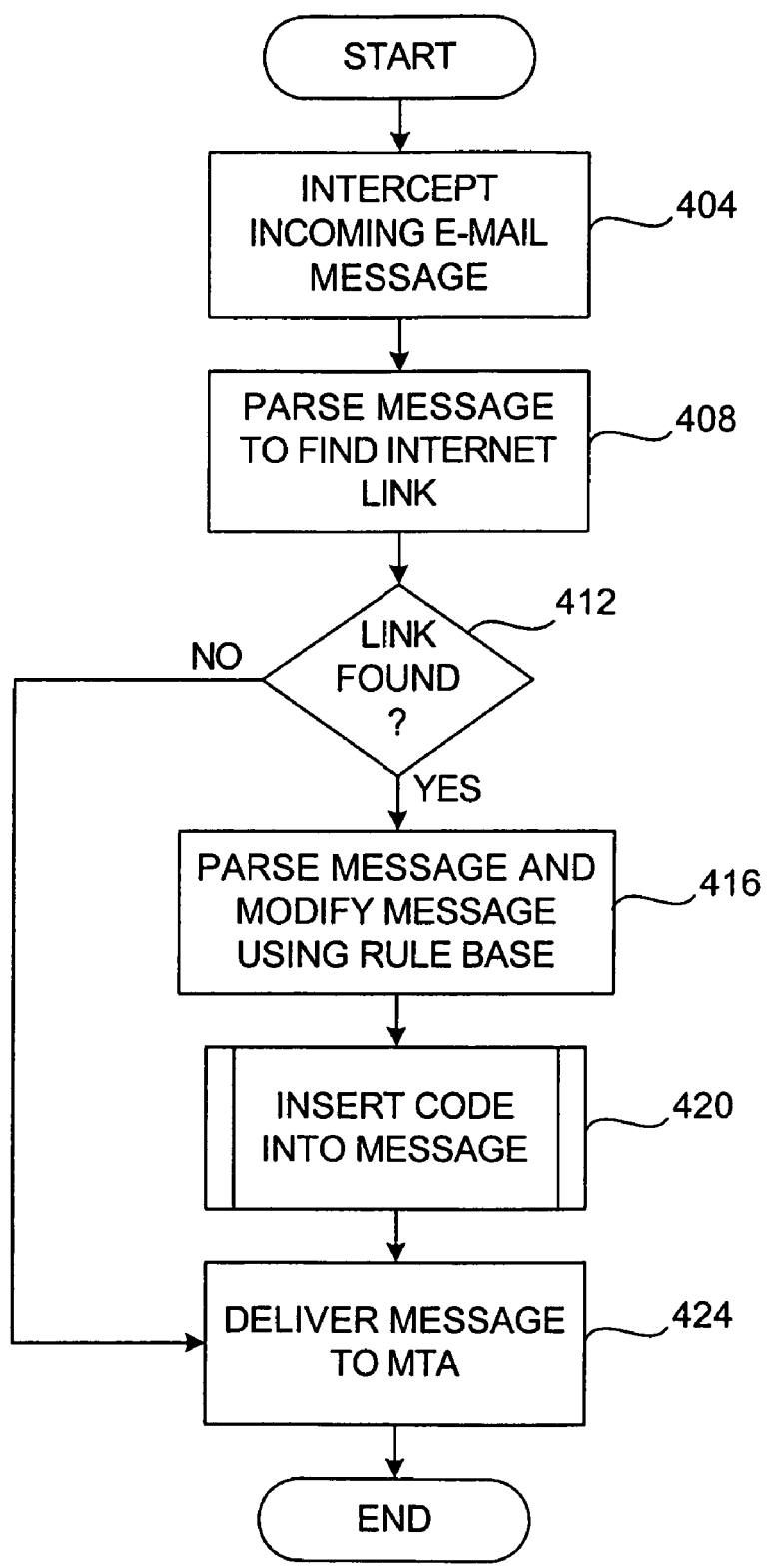
FIG. 8 is a flow diagram describing one embodiment by which program code is inserted into an incoming e-mail message.

FIG. 8 is a flow diagram describing one embodiment by which program code is inserted into an incoming e-mail message. This figure is exemplary, and one of skill in the art will appreciate that other implementations are possible that are within the spirit and scope of the present invention.

In step 404, an incoming e-mail message that is destined for an end user is intercepted in conjunction with an MTA as has been illustrated above. A copy of the e-mail message (or the original) is delivered to the insertion module that will then choose to act upon the message or not. Or, the module acts upon the message in place. Depending upon a particular implementation, insertion module 150 may be located at a destination e-mail server, on a gateway computer or on any network in-line device that can intercept SMTP network traffic.

In one embodiment, all incoming e-mail messages are intercepted and reviewed as it is unknown at this stage whether the e-mail message might be a phishing e-mail message. In other embodiments, certain e-mail messages may be excluded from interception so as to reduce the number of messages that need to be screened. For example, messages that could be excluded include: known spam messages (identified as spam because they originate from a certain domain, for example); messages from specific domains (such as messages originating from within the corporation); messages that include a digital signature; and messages received over a VPN (virtual private network). In addition, certain e-mail messages may always be targeted for interception based on where they originate or based on other heuristics.

At this point it is instructive to review the various types of phishing e-mail messages. There are two widely used types of such messages. A first type of message includes some kind of Internet link within the body of the message; the end user is encouraged to follow that link. Such a type of message has been illustrated above. A second type of phishing e-mail message includes a hostile attachment, and the body of the message attempts to trick the user into executing the attachment. For example, an attachment might have a double extension such as ".exe.gif.", which could fool a user into thinking that the attachment is an image and not an executable program. If executed, the attachment can do something malicious such as installing spyware software on the user computer, or by installing "key logger" software on the user computer that monitors the user's keystrokes. Should the user access their bank account web site at a later date, this hostile software can be arranged to intercept confidential information and relay this information to the scammers.

In step 408, in one of the embodiment, the message is parsed or otherwise analyzed to determine whether the message is a potential phishing e-mail message. Step 408 is primarily used to judge if a message needs to the further processing. For example, the message is parsed to determine if an Internet link is present within the message. By Internet link, we refer to a hyperlink, an IP address, a URL, or other special code within the e-mail message that allows a user to link to a web site on the Internet or to post information to a web site. Internet link also refers to plain text in a message that a user can paste into a browser in order to visit a web site. Techniques for parsing an e-mail message are known to those of skill in the art and can apply to a message that is text, RTF, HTML or other format.

Alternatively, the message is analyzed to determine if it is of the second type of phishing e-mail message, i.e., it has an attachment with a double extension or other indication that the attachment might be hostile. Other heuristics may be used to determine that the message is potentially hostile and may need further processing; the invention is not limited to the example heuristics shown. For example, a potentially hostile or malicious electronic message may be defined as any message that has the potential to mislead, trick, fool or otherwise has the potential to have an undesirable effect on the end user.

If a link is not found, or if it is otherwise determined that the message is not a phishing e-mail message, then in step 412 it is determined that the message poses little risk of being a phishing e-mail message and in step 424 the original message (without modification) is delivered to the MTA or other indication is given indicating that the original message may be sent to the end user. Checking for an Internet link in an e-mail message to see if it is potentially a phishing e-mail message (and thus needs further processing) is only one particular embodiment. Some phishing e-mail messages may come with HTML forms embedded and will not have an HTML anchor to direct a user to another web page.

In step 416, the message is further parsed and perhaps modified according to rule base 225 (see FIG. 9). Step 416 is optional but may be used in cases where the Internet scammer has modified the message or is using a new technique to fool an end user. This step provides the flexibility needed to modify a message in such a situation i.e., it is used to enhance the flexibility of phishing e-mail handling. Whereas the parsing step in 408 primarily looks for an Internet link, the parsing step of 416 looks for other information based upon the rule base. A message might be modified and have no extra script code inserted, or it is possible that code will be inserted and no other modification would take place. Rule base 225 lists exemplary rules that can be used to modify a message. Rule base 225 is modified on a periodic basis by using software update techniques commonly known in the field, such as by manually using a compact disc, receiving updates via electronic mail, or by downloading an updated rule base from an Internet web site.

In step 420, JavaScript (or any equivalent ECMAScript) code is inserted into the message as explained in more detail below in FIG. 10. In step 424, the modified message from step 420 (or the original message if no link was found) is delivered to the MTA for eventual delivery to the end user.

FIG. 9 illustrates one embodiment of a rule base 225 that may be used in conjunction with insertion module 150. Rule base 225 may be present within software insertion module 150 or may be a separate program or software database that is in association with module 150. Rule base 225 may be implemented in any suitable language or database such as XML, SPL (security policy language), plain text, or on a Microsoft SQL server or an Oracle database server.

Rule base 225 includes a "Parse For" field that indicates an item to be searched for in the incoming e-mail message, a "Condition" field 382 that indicates a condition to be tested for within the e-mail message, and an "Action" field 384 indicating an action to be taken when the condition is true. Exemplary rules 390-394 are listed, and the rule base may contain any number of other rules 396. For example, rule 392 states that the message should be parsed to determine if JavaScript code is present, and if the body of the message contains JavaScript code, then that this code should be transformed into a comment such that it is inoperative yet would still be present within the message.

Figure 10:
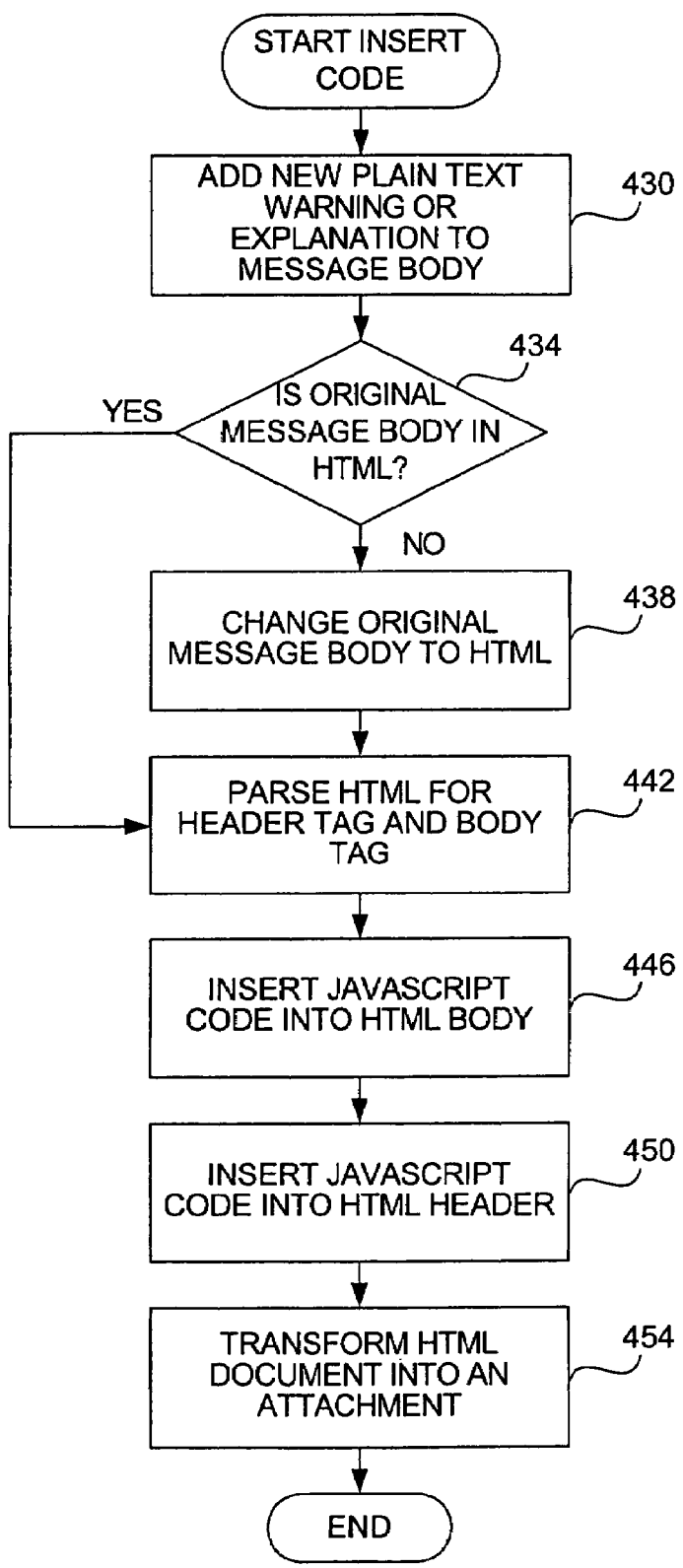
FIG. 10 is a flow diagram describing one embodiment by which an insertion module inserts code into an e-mail message.
Figure 11:
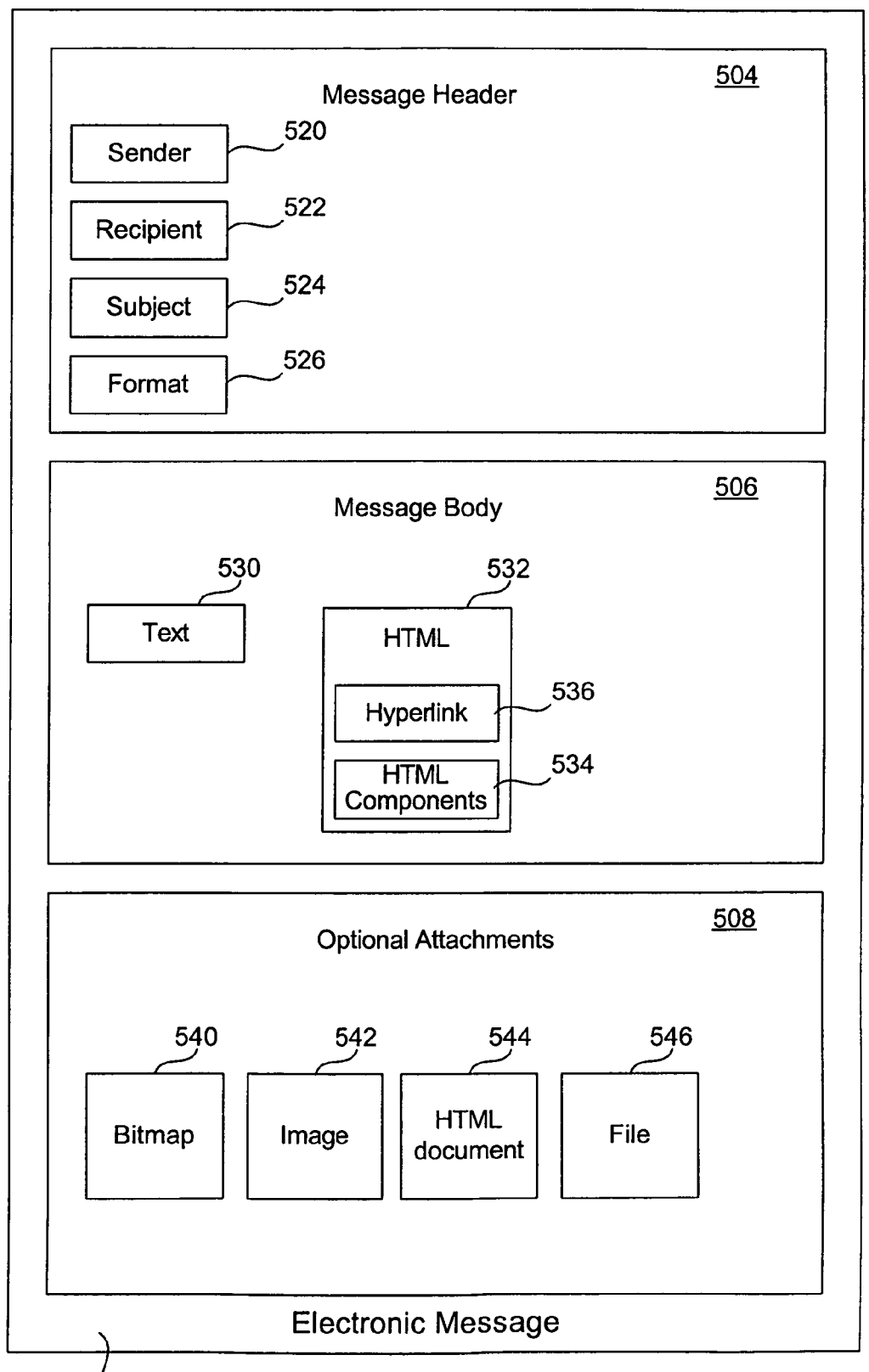
FIG. 11 illustrates a typical electronic mail message.
Figure 12:
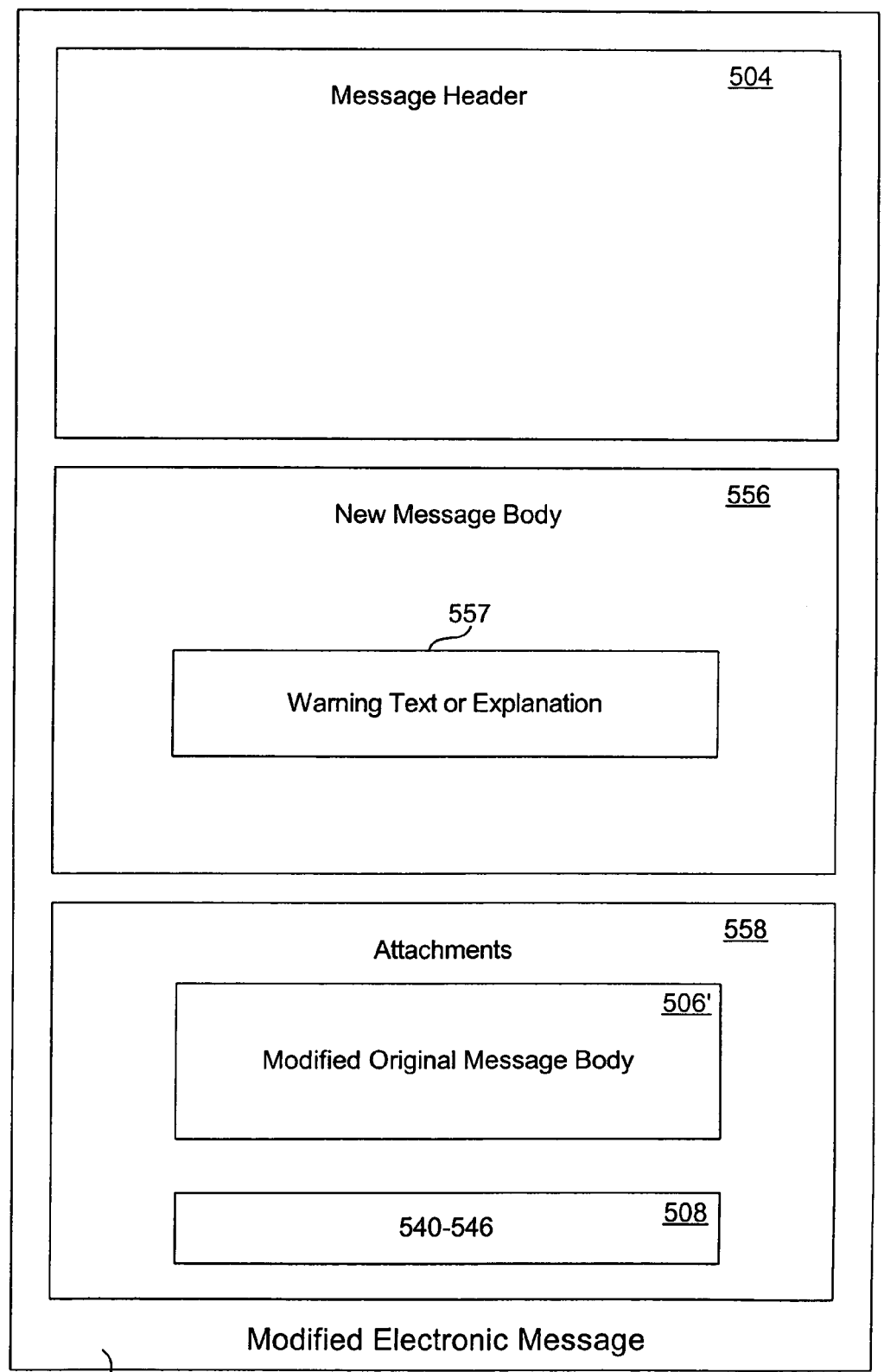
FIG. 12 illustrates a modified electronic mail message with modified attachments.
Figure 13:
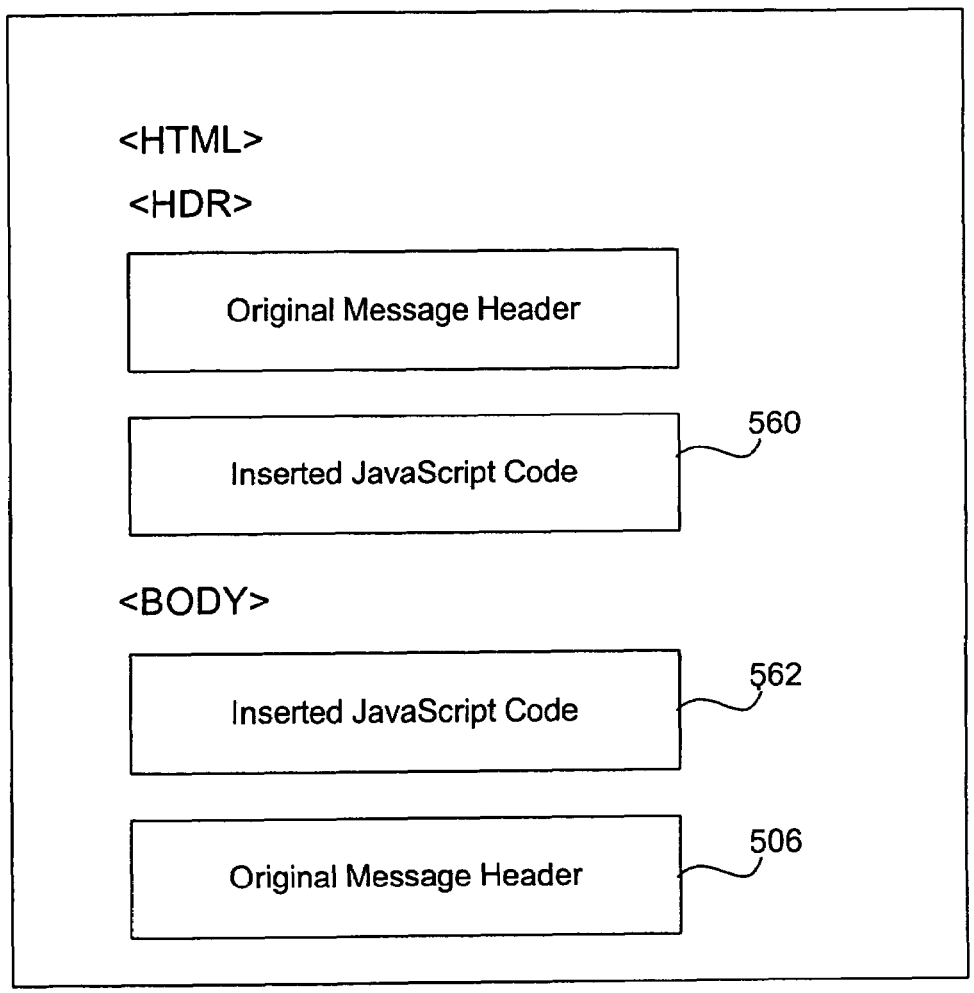
FIG. 13 illustrates a modified HTML body that has been transformed into an HTML document.

FIG. 10 is a flow diagram describing one embodiment by which insertion module 150 inserts code into an e-mail message. FIGS. 11-14 are used in conjunction with FIG. 10. FIG. 11 illustrates a typical electronic mail message 502 that includes a message header 504, a message body 506 and optional attachments 508. FIG. 12 illustrates the modified electronic mail message 502' that includes message header 504, a modified new message body 556 and modified attachments 558. FIG. 13 illustrates the attachment 506' to the modified message that includes the original message body.

FIG. 14 illustrates another embodiment of an HTML document 506" that may be the attachment to the modified message. Shown as part of the HTML header 802 is original script code 810, and shown as part of HTML body 804 is original script code 822. Both of these script code portions 810 and 822 may be optionally removed by insertion module 150 or by other suitable mechanism.

The message header 504 of FIG. 11 includes typical fields such as information identifying a sender and his or her e-mail address at 520, information on the recipient 522, a subject 524, an e-mail format 526, and other information such as the "received:" header field that shows the intermediate MTA servers that the e-mail message went through, the "Return-Path" header field or any other useful "X-" proprietary fields.

Message body 506 may contain a text message 530, or a message in HTML format 532 (or a combination of both). HTML 532 may also include other HTML components 534 such as Form or Map, and a hyperlink 536 that allows a user to quickly access a web site on the Internet. Link 536 might also be in a plain text form requiring the user to cut and paste the text into a browser window before being able to access a web site. Also, an Internet link in plain text format could also direct a user to a web site after it is clicked upon. Optional attachments 508 might include any number of bitmaps 540, any number of images 542 in a variety of formats, an HTML document 554 and any number of other types of computer files 546.

In step 430 of FIG. 10, the process begins by replacing the message body 506 of e-mail message 502 with new plain text 557 that provides a warning that a phishing scam might be underway, or an explanation regarding any modifications to the e-mail message that have been performed. Plain text 557 can be customized by an IT administrator at any time. Step 430 is an optional step. As shown, new text 557 has been added to the message body to replace the original message body 506. Step 434 determines whether original message body 506 is in plain text format, RTF or in HTML (for example by looking at "content-type" in the e-mail message MIME header). If in HTML, control moves to step 442. If not, then in step 438 the original message body is converted into an HTML document. Alternatively, the entire message can be converted or the entire message including its attachments can be converted into an HTML document. Transformation from plain text or RTF into HTML is performed to enable insertion of scripting language code that can then run within a browser. Next, in step 442 this new HTML document is parsed to find its header tag and its body tag.

In step 446, appropriate JavaScript code 562 to combat phishing is inserted into the HTML body part of this new HTML document. In step 450, appropriate optional JavaScript code 560 is inserted into the HTML header part of the new HTML document. For example, the script code in the body part will be executed after the browser has finished loading the HTML document, and the script code in the header part will be executed when there is an event triggered in the body part.

Inserted JavaScript code 560 and 562 of FIG. 13 has been previously stored locally on the gateway computer (for example). In one embodiment, code 560 or 562 can be treated as (or be part of) a signature or pattern file that can be updated. In this way, the script code can be updated periodically to cover any unknown phishing exploit in the future.

In step 454, original message body in the form of an HTML document 506' is transformed into an attachment 558 and is appended to modified message 502'. Thus as shown in FIG. 12, modified message 502' includes as attachments 558 the modified original message 506' (in HTML format) and any original attachments 540-546. Alternatively, HTML document 506' can be stored on a web server as a file that can be later accessed by the end user. Or, HTML document 506' can be stored into an end user's personal folder on the network for later access. And as mentioned previously, the HTML document can represent the original message body or the entire message including attachments.

FIG. 13 illustrates the modified HTML body 506' that has been transformed into an HTML document. JavaScript code 560 has been inserted into the HTML header and JavaScript code 562 has been inserted into the HTML body. As has been explained, the original message body from the potential phishing e-mail message is converted into HTML format to allow JavaScript to be inserted and run, and this modified message body is then included as an attachment of the original message. It is preferable to include this HTML code as an attachment to the original message because a variety of e-mail clients (such as Microsoft Outlook) do not allow a scripting language to be run when present in the body of an e-mail message. Nevertheless, in certain embodiments where it is believed that an e-mail client used by the end user will allow a scripting language to be run if present in the body of an e-mail message, it is possible to retain the original message body (after having been modified to HTML) and insert the JavaScript therein, without having to place the modified message body into an attachment. For example, certain e-mail clients such as earlier versions of Microsoft Outlook and Outlook Express do allow a scripting language to be run directly in the e-mail client program. Alternatively, if the original HTML part is embedded as an attachment already, it can be modified directly as mentioned above.

Figure 15:
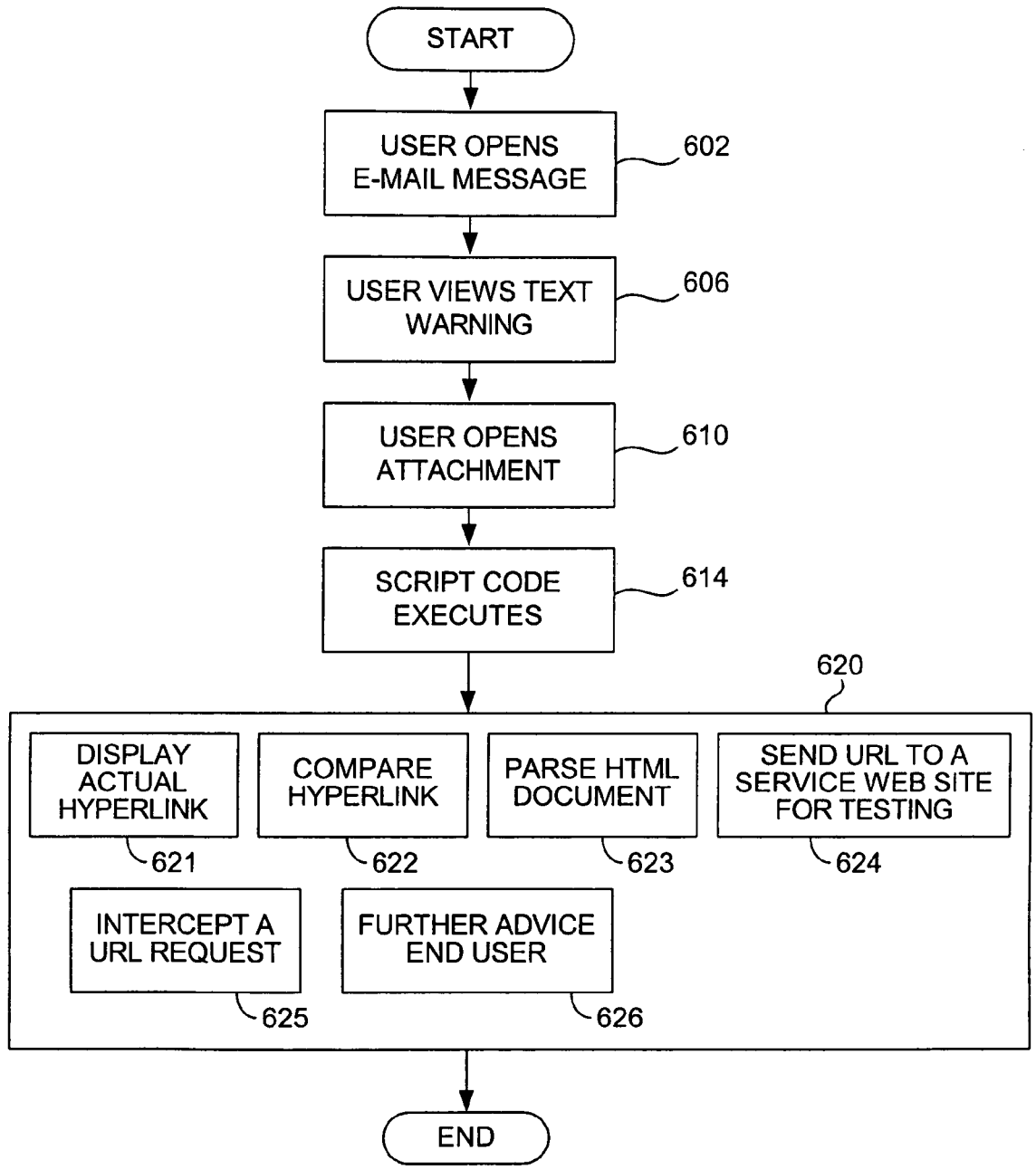
FIG. 15 is a flow diagram describing one embodiment of execution of script code that has been inserted into an e-mail message.

FIG. 15 is a flow diagram describing one embodiment of execution of script code that has been inserted into an e-mail message. As described previously, script program code (written in JavaScript, for example) has been inserted into an e-mail message to help combat the Internet scam known as phishing. The e-mail message is delivered to the end user or is made otherwise available, and in step 602 the end user opens the e-mail message using any suitable client software such as Microsoft Outlook, Novell Groupwise, browser software, or Microsoft Outlook Express. Alternatively, as mentioned above, the HTML document (including the inserted script code) was stored as a file on a web server. In this situation, a URL link to the HTML file is sent to the user in a message so that the user can click on the URL link to open his or her message. Or, if the HTML document has been stored in the user's personal folder, a message can be sent to the user indicating that a message is ready for viewing in his or her network folder etc. Thus, delivery to the user of the original e-mail message including the inserted script code can be accomplished in many different ways. In step 602 the user will access this message in a manner consistent with the technique used to store or deliver it to the user.

In step 606, the user views any warning or explanation message that has replaced the original message body of the e-mail message. In those embodiments where it is not necessary to place the original message body into an attachment, the user might view a warning or explanation message that has been placed at the beginning of the original message body. Assuming that the body has been placed into an attachment, in step 610 the user opens the attachment holding the original message body typically by double clicking on it or by performing another action to open an attachment. It should be noted that the user may also open any other of the original attachments that were attached to the original message. When the attachment containing the original message body is opened, a browser window will open as this attachment is an HTML document. Any suitable browser software may be used such as Netscape Navigator, Microsoft Explorer, Apple Safari, or Mozilla Firefox.

Once the browser opens it begins immediately to execute the script code that has been inserted into this HTML document. Assuming that the script code has been inserted at the beginning of the original message body, the executing script code can take any of a variety of actions as listed in block 620. For example, in the action described at 621 the script code is arranged to intercept any user input event (such as a mouse point or click, a keyboard entry, a voice command or other pointing device input) that indicates a desire to click on or otherwise use a hyperlink in the message. In this action, the code, for example, may present to the user in a dialogue box the text of the hyperlink that appears on the face of the e-mail message in juxtaposition with the actual URL to which the user would be directed if the hyperlink were to be clicked upon. Because it is common for the Internet scammer to hide the true web site destination by using deception in the HTML code, there may be a discrepancy. Specifically, the script code presents the actual URL found after the "href" HTML tag instead of the HTML anchor value (the text string presented on the face of the message) to the end user. The user can then choose for themselves whether to use the dialogue box to click on the presented hyperlink or not.

The action at 622 describes that the script code may also compare a hyperlink when a user input event is detected. For example, the script code compares the hyperlink on the face of the e-mail message to the actual URL to which the end user will be directed in the underlying HTML code. The script code may also compare the domain of the sender of the e-mail message to either the hyperlink or the underlying URL. If there is a discrepancy after any of these comparisons, the script code takes any of a variety of actions. For example, the action may be to simply provide a warning message to the user. Or, the script code may disable the hyperlink and prevent access to the spurious web site. A dialogue box may open up allowing the user to choose whether they wish to connect or not, or whether to report this event to a third party anti-phishing service. Other suitable actions may also be taken.

In the above actions, the script code waits for a user input event in order to determine which hyperlink the user has selected before taking any action. In another embodiment, the entire HTML document may be parsed before any user input as shown at 623. Once parsed, the script code can display a warning to the user, can compare any hyperlinks that are found to an actual URL, or can take other action depending upon the result of the parsing.

Figure 1:
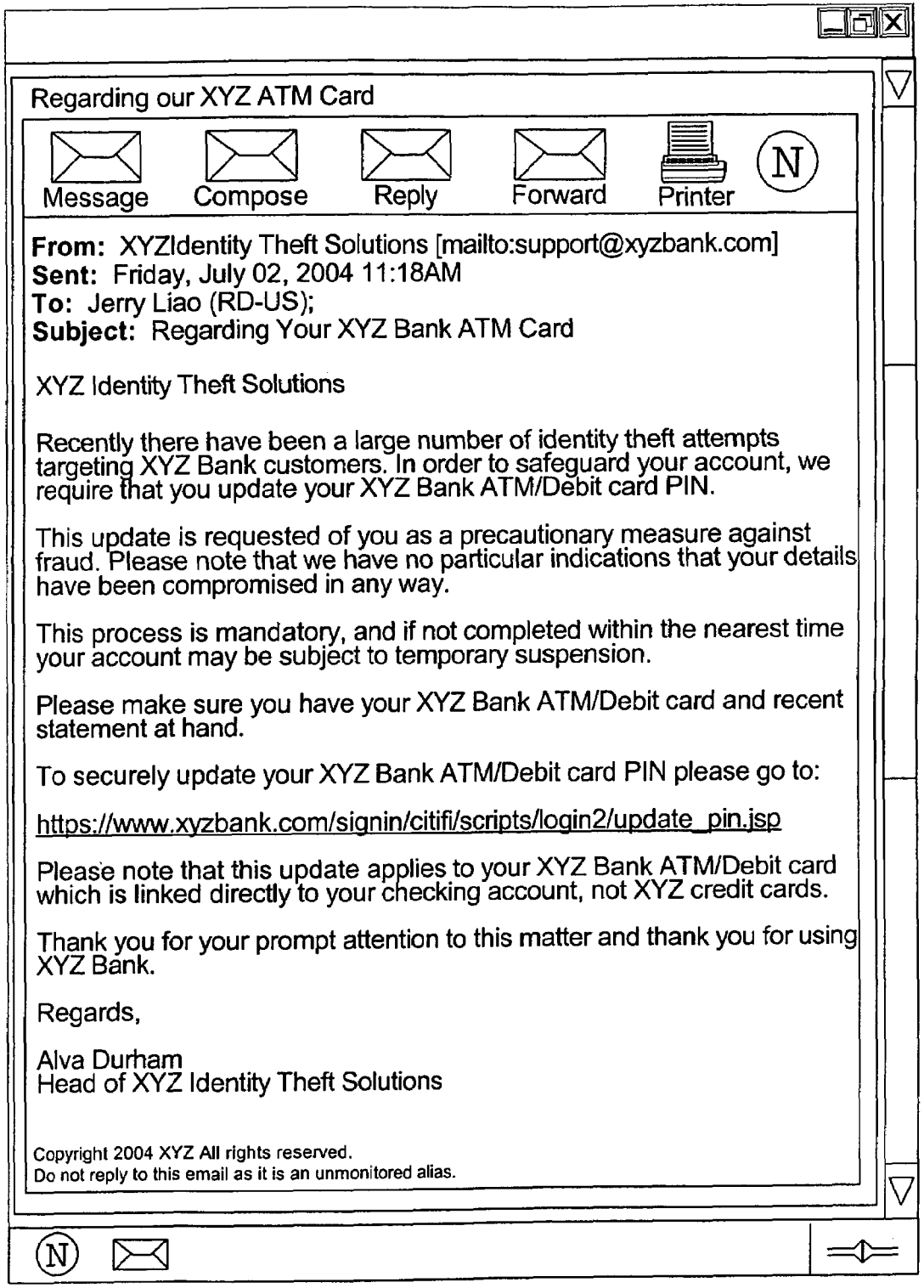
FIG. 1 is an example of an actual phishing e-mail message.
Figure 2:
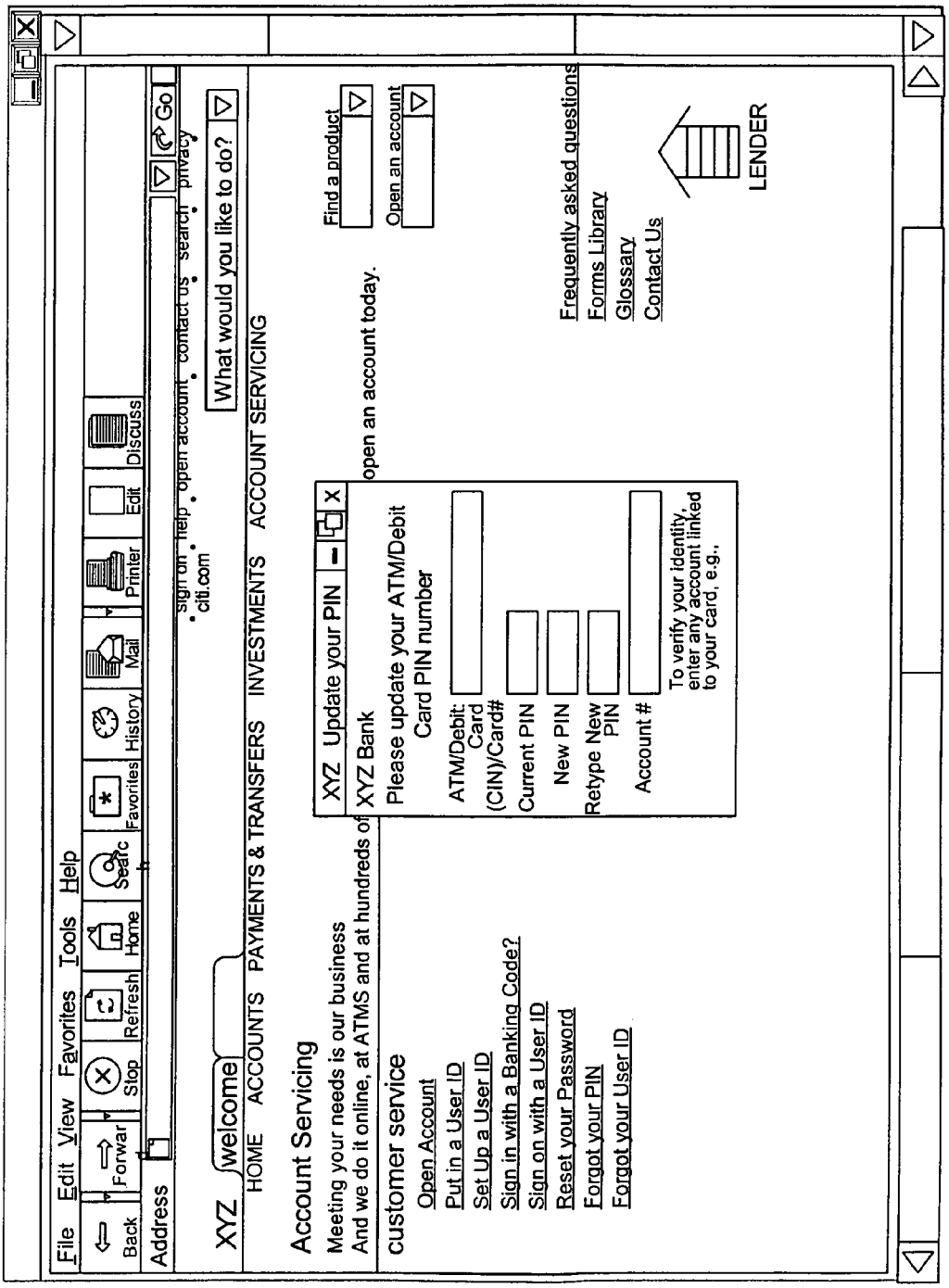
FIG. 2 illustrates two windows from a spurious web site.

The action at 624 indicates that any URL found in the HTML code can be checked by using a reverse DNS lookup or by sending the URL to a "who is" service in order to determine the actual IP address of the underlying URL. This resulting IP address can then be compared with the IP address of the underlying URL link to see if the two are within a reasonable address range. If not, the script code can provide a suitable warning to the user or take other action. In the above example of FIG. 2, a click on the fake link shown in the e-mail message actually will bring the user to the IP address "61.128.198.62". But a reverse DNS lookup shows that the true "www.XYZbank.com" URL actually points to an IP address of "192.193.195.132" (for example) and the two IP addresses are totally different and not in the same IP subnet range. The fake link leads to the IP address of the Internet scammer. In one embodiment, a client side module or a third party web server hosts this type of heuristic web site checking service to accompany the present invention.

The action at 625 indicates that any potential URL request or form submission action can be intercepted; once intercepted, the script code opens up a dialogue box to ask the user for confirmation. Another potential action that may occur (not shown) happens when the end user attempts to open a link to an unknown web site. The script code can be arranged to query a proxy service that can determine if a secure port is open on this web site (such as port 443 used for https communication). If the port is open, the proxy service can retrieve the server certificate from the web site and verify whether the web server is legitimate.

Other actions may be specific to a particular type of phishing e-mail message, for example a message that tries to trick the user into opening, running or executing a hostile attachment. When one of these messages is detected, the action may be to place a warning in the message body telling the user not to open the attachment. Or, the script code can be arranged to only warn the user when the attachment is clicked once, or the warning may appear after the attachment has been opened.

In 626, other warnings or explanations are provided to the end user depending upon the results of the script code execution. Once the script code has fully executed and no other actions are to be taken, the process ends.

Figure 16:
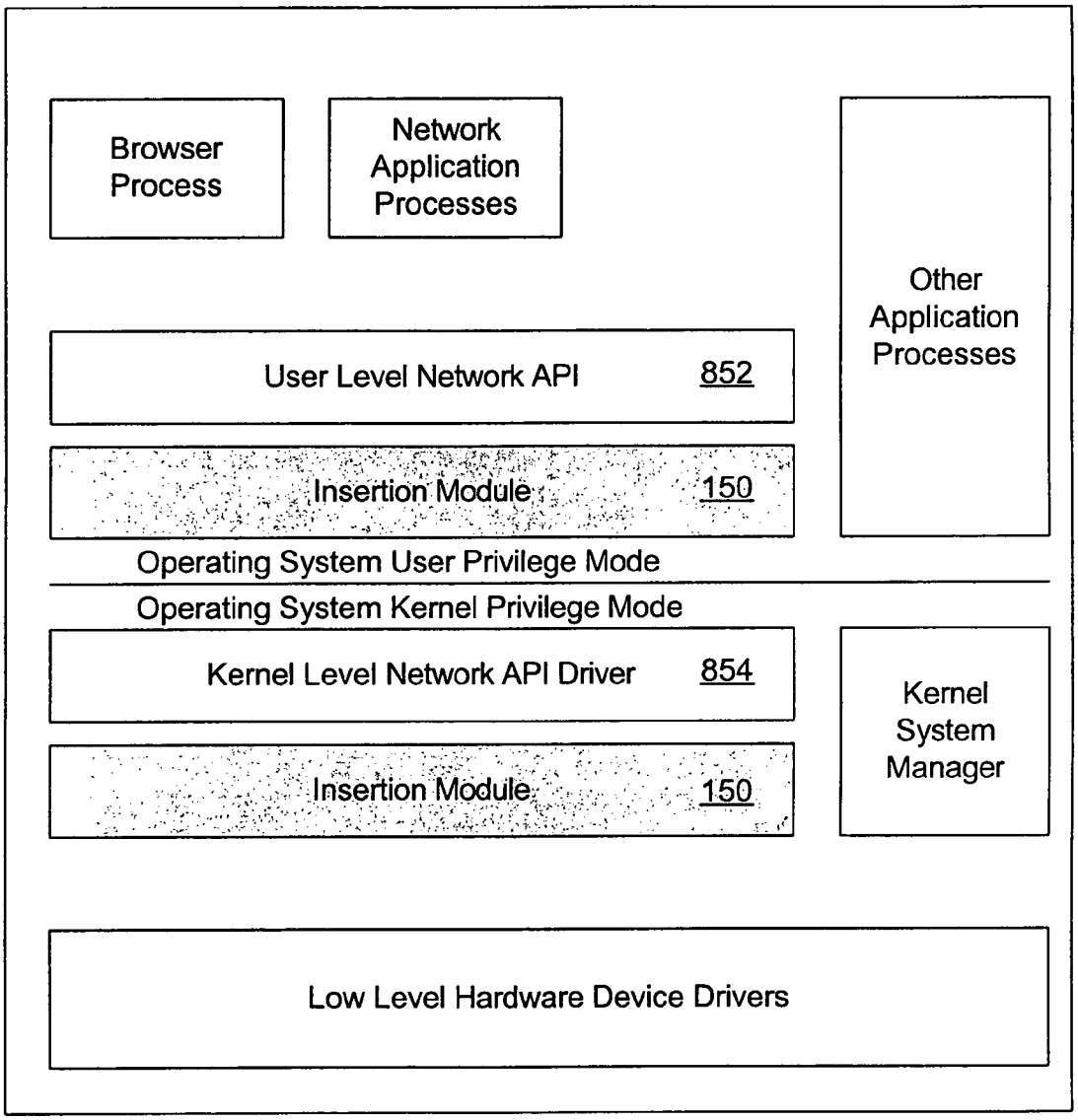
FIG. 16 is a block diagram illustrating an alternative embodiment for an end user computer operating system.

FIG. 16 is a block diagram illustrating an alternative embodiment for an end user computer operating system 850. In this embodiment, insertion module 150 is not necessarily present on a gateway or server computer but is present on the user's own computer. Insertion module 150 may be hooked up via an interface to the user level network API 852, or, module 150 may take the form of a kernel driver that is in communication with kernel level network API driver 854. In this fashion, script code is inserted into an incoming e-mail message when the item in question reaches the end user's computer.

Figure 17:
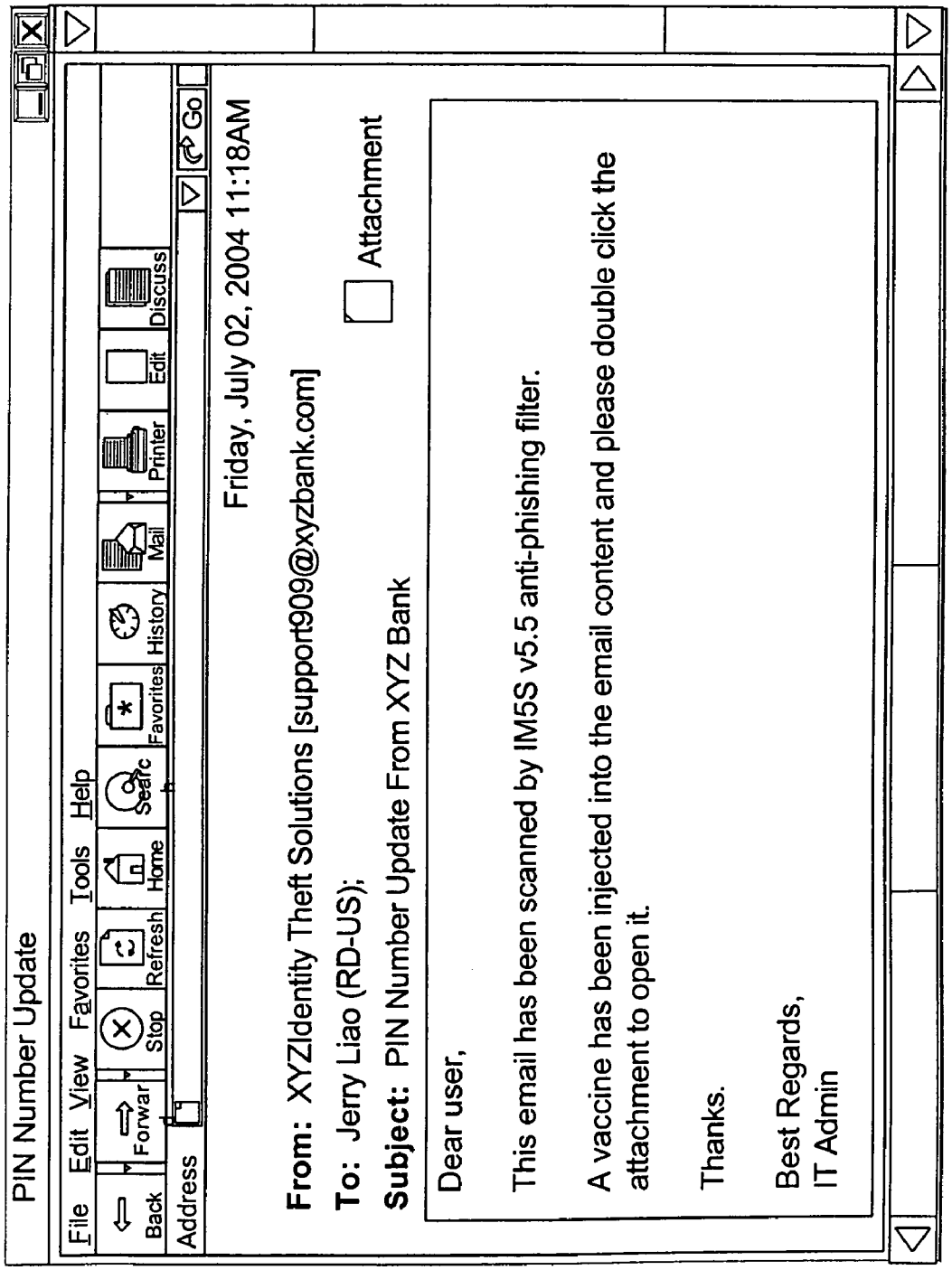
FIG. 17 is an example of script code inserted into an e-mail message and then delivered to a user in an attachment.

FIG. 17 shows an example of a phishing e-mail message that has been processed according to an embodiment of the present invention. In this example, a portion of the original phishing e-mail message along with the inserted script code has been placed into an attachment. The message shown indicates that a corporate computer has scanned the message, inserted code, and provided the message in an attachment. The user may now click on the attachment to open it and read the original message and cause the inserted script code to execute.

Figure 18:
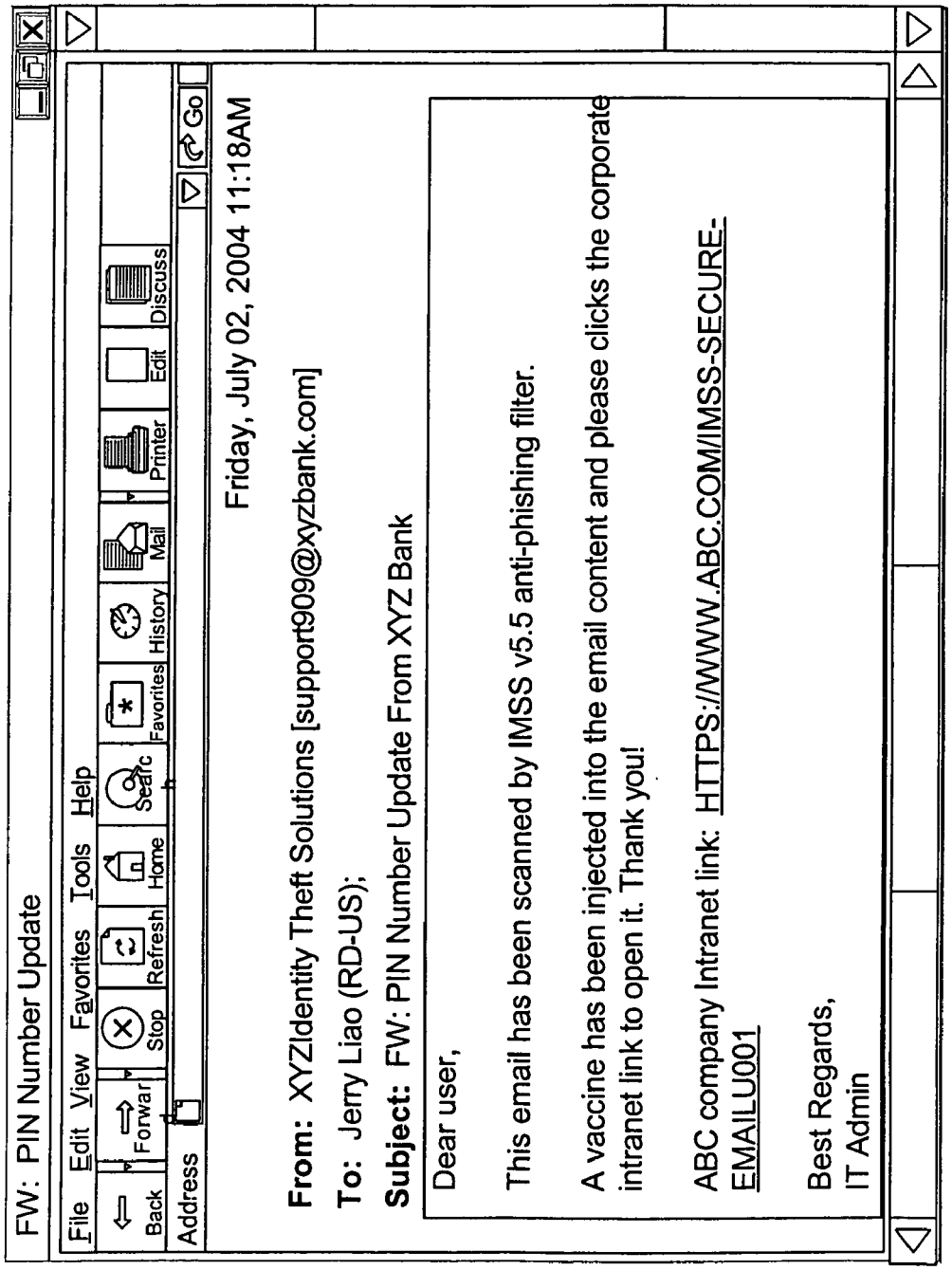
FIG. 18 is an example of script code inserted into an e-mail message and then delivered to a user via a corporate intranet.

FIG. 18 shows an example of a phishing e-mail message that has been processed according to an embodiment of the present invention. In this example, a portion of the original phishing e-mail message along with the inserted script code has been placed into a location accessible via the corporate intranet. The message shown indicates that a corporate computer has scanned the message, inserted code, and has saved the result on a local corporate server. The user may now click on the intranet link to read the original message and cause the inserted script code to execute.

COMPUTER SYSTEM EMBODIMENT

Figure 19A:
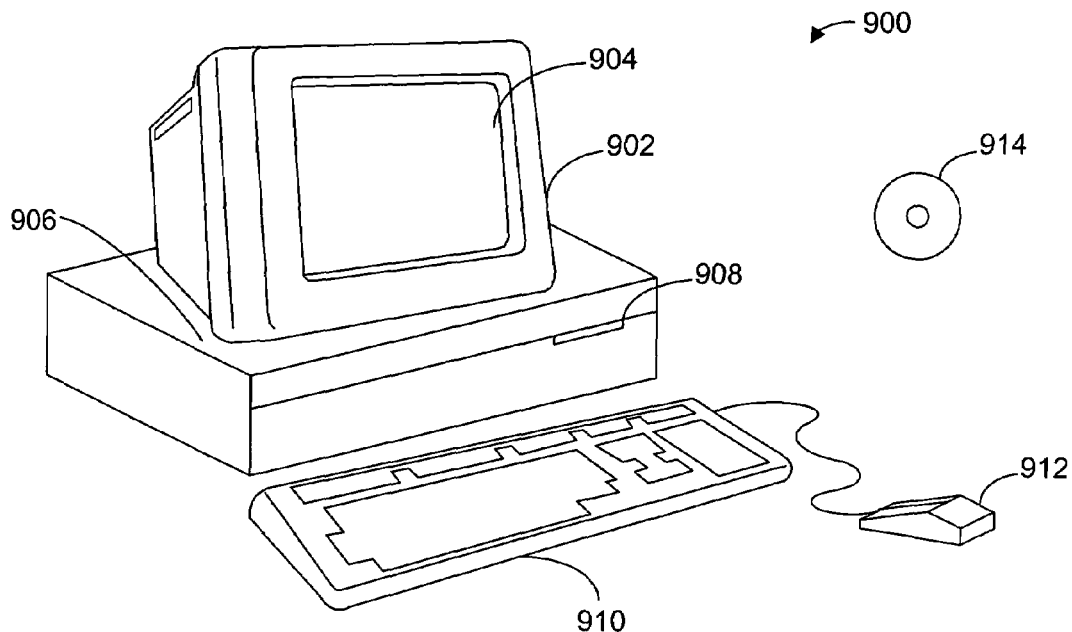
FIGS. 19A and 19B illustrate a computer system suitable for implementing embodiments of the present invention.
Figure 19B:
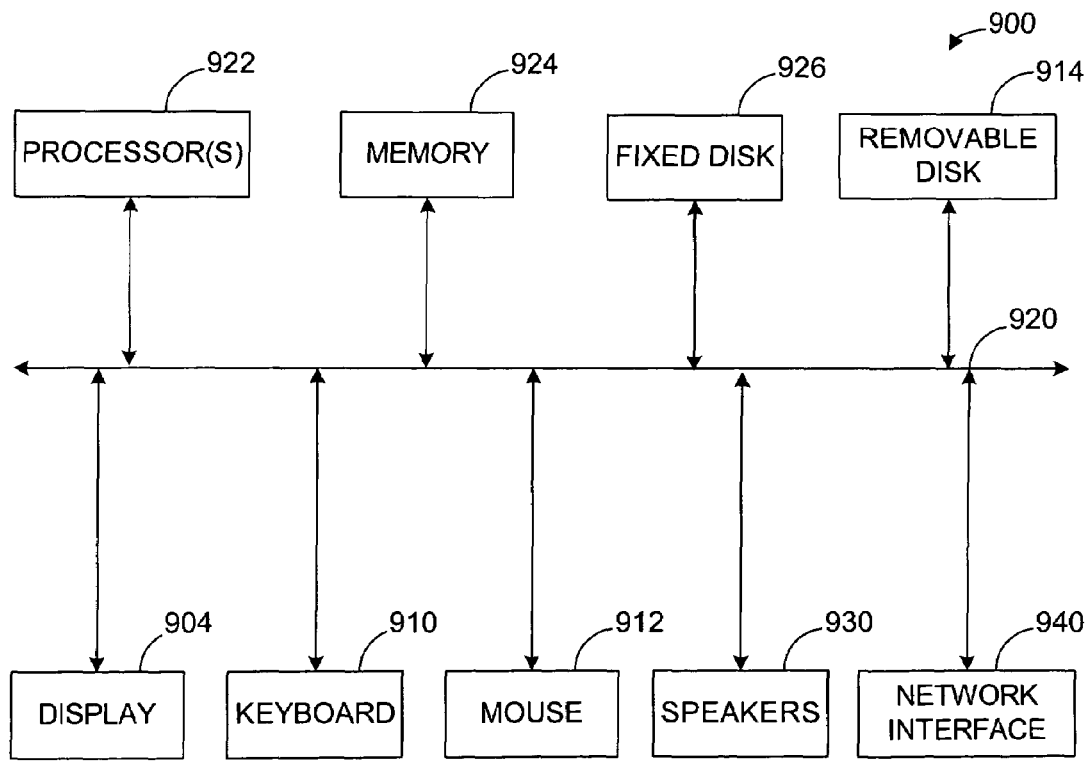

FIGS. 19A and 19B illustrate a computer system 900 suitable for implementing embodiments of the present invention. FIG. 19A shows one possible physical form of the computer system. Of course, the computer system may have many physical forms ranging from an integrated circuit, a printed circuit board and a small handheld device up to a huge super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 19B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of inserting scripting language code into an electronic message, said method comprising:
    receiving said electronic message that is destined for an end user at an end-user device;
    determining if said electronic message is hostile to said end user by scanning said electronic message and parsing said electronic message;
    converting the message body of said electronic message into HTML format to form an HTML document having an HTML body and an HTML header so that said electronic message can execute within a browser;
    inserting URL-request intercepting scripting language code into the HTML body of said HTML document using an insertion module software that copies said electronic message;
    modifying said electronic message according to a rule base, wherein the electronic message is parsed to determine if the message body contains Java script code and transforming the Java script code into a comment and wherein an action is performed on the Java script code such that if there is an electronic mail "From" header and if a sender domain exists, the sender domain is inserted into the Java script code; and
    delivering said HTML document to a computing device of said end user, whereby said electronic message is modified to include said scripting language code.

2. A method as recited in claim 1 wherein said step of inserting occurs on a computer located upstream of the end user's computing device.

3. A method as recited in claim 2 wherein said computer is a gateway computer.

4. A method as recited in claim 1 wherein said scripting language code is arranged to execute on said computing device used by said end user to view said electronic message.

5. A method as recited in claim 1 further comprising:
    adding said HTML document as an attachment to said electronic message.

6. A method as recited in claim 1 further comprising:
    adding other scripting language code to an HTML header of said HTML document.

7. A method as recited in claim 1 wherein said electronic message is an e-mail message or an instant message.

8. A method as recited in claim 1 wherein said step of determining if said electronic message is hostile includes determining if said electronic message is a phishing message.

9. A method as recited in claim 1 wherein said scripting language code is VBScript, JScript, or ECMAScript.

10. A method as recited in claim 1 further comprising:
    modifying said electronic message based on information contained in a rule base.

11. A method as recited in claim 1 wherein said scripting language code is arranged to counter a phishing scam.

12. A method as recited in claim 1 wherein said step of inserting occurs at an e-mail server associated with a sender of said electronic message, at a server of an ISP used by said sender of said electronic message, at a server of an ISP used by said end user of said electronic message or at an e-mail server associated with said end user.

13. A method as recited in claim 1 wherein said step of inserting occurs on said end user's computing device.

14. A method of executing scripting language code contained within an electronic message, said method comprising:
    receiving said electronic message at a computing device of an end user, said electronic message including hostile content and said scripting language code;
    receiving an indication from said end user to open said electronic message;
    invoking browser software on said computing device of said end user, said browser software capable of executing said scripting language code;
    parsing the electronic message to determine whether a message body contains Java script code and transforming the JavaScript code into a comment and parsing the electronic message to determine whether there is an electronic mail "From" header in the electronic message and if a sender domain exists, inserting the sender domain into the JavaScript code;
    executing said scripting language code on said computing device of said end user;
    intercepting a URL request by enumerating one or more HTML elements that are capable of triggering a URL request;
    obtaining a JavaScript object that represents one of the one or more HTML elements.

15. A method as recited in claim 14 wherein said step of receiving an indication from said end user includes receiving an indication to select said electronic message, to read said electronic message, or to open an attachment of said electronic message.

16. A method as recited in claim 14 further comprising:
    presenting a warning message in the body of said electronic message warning said end user about said hostile content.

17. A method as recited in claim 14 wherein said scripting language code is included in an attachment to said electronic message.

18. A method as recited in claim 17 wherein said attachment is an HTML document.

19. A method as recited in claim 14 wherein said electronic message is an e-mail message or an instant message.

20. A method as recited in claim 14 wherein said hostile content indicates that said electronic message is a phishing message.

21. A method as recited in claim 14 wherein said scripting language code is VBScript or, JScript, ECMAScript.

22. A method as recited in claim 14 wherein said step of performing an action includes displaying an actual hyperlink, comparing a hyperlink, parsing said HTML document, testing a URL, intercepting a URL request, comparing a sender's address domain with an actual URL domain, comparing a displayed URL domain with an actual URL domain, comparing a sending IP address with a sender's address domain, or advising said end user.

23. A method as recited in claim 14 wherein said step of performing an action counters a phishing scam.

24. A computer-readable medium comprising computer code for inserting scripting language code into an electronic message, said computer code of said computer-readable medium effecting the following:
   receiving said electronic message that is destined for an end user at an end-user device;
   determining if said electronic message is hostile to said end user by scanning said electronic message and parsing said electronic message;
   converting the message body of said electronic message into HTML format to form an HTML document having an HTML body and an HTML header so that said electronic message can execute within a browser;
   inserting URL-request intercepting scripting language code into the HTML body of said HTML document using an insertion module software that copies said electronic message;
   modifying said electronic message according to a rule base, wherein the electronic message is parsed to determine if the message body contains Java script code and transforming the Java script code into a comment and wherein an action is performed on the Java script code such that if there is an electronic mail "From" header and if a sender domain exists, the sender domain is inserted into the Java script code; and
   delivering said HTML document to a computing device of said end user, whereby said electronic message is modified to include said scripting language code.

25. A computer-readable medium comprising computer code for executing scripting language code contained within an electronic message, said computer code of said computer-readable medium effecting the following:
   receiving said electronic message at a computing device of an end user, said electronic message including hostile content and said scripting language code;
   receiving an indication from said end user to open said electronic message;
   invoking browser software on said computing device of said end user, said browser software capable of executing said scripting language code;
   parsing the electronic message to determine whether a message body contains Java script code and transforming the JavaScript code into a comment and parsing the electronic message to determine whether there is an electronic mail "From" header in the electronic message and whether a sender domain exists, inserting the sender domain into the JavaScript code;
   executing said scripting language code on said computing device of said end user;
   intercepting a URL request by enumerating one or more HTML elements that are capable of triggering a URL request;
   obtaining a JavaScript object that represents one of the one or more HTML elements.

* * * * *

UNITED STATES PATENT AND TRADEMARK OFFICE
CERTIFICATE OF CORRECTION

PATENT NO. : 7,461,339 B2 Page 1 of 1
APPLICATION NO. : 10/970604
DATED : December 2, 2008
INVENTOR(S) : Liao et al.

It is certified that error appears in the above-identified patent and that said Letters Patent is hereby corrected as shown below:

In the Specification:

Col. 8, line 25     change "oil" to --on--.

Col. 8, line 27     change "all" to --an--.

Col. 8, line 29     change "all" to --an--.

Signed and Sealed this

Twenty-first Day of July, 2009

JOHN DOLL
*Acting Director of the United States Patent and Trademark Office*